United States Patent
Kryskow, Jr.

(10) Patent No.: US 7,610,327 B2
(45) Date of Patent: Oct. 27, 2009

(54) METHOD OF AUTOMATICALLY BASELINING BUSINESS BANDWIDTH

(75) Inventor: Joseph M. Kryskow, Jr., Hudson, NH (US)

(73) Assignee: Infrastructure Innovations LLC, Boston, MA (US)

(*) Notice: Subject to any disclaimer, the term of this patent is extended or adjusted under 35 U.S.C. 154(b) by 644 days.

(21) Appl. No.: 10/223,067

(22) Filed: Aug. 16, 2002

(65) Prior Publication Data

US 2003/0053455 A1  Mar. 20, 2003

Related U.S. Application Data

(63) Continuation of application No. PCT/US01/05119, filed on Feb. 16, 2001.

(60) Provisional application No. 60/183,701, filed on Feb. 18, 2000.

(51) Int. Cl.
 G06F 15/177 (2006.01)
 G06F 15/173 (2006.01)
 G06F 11/00 (2006.01)

(52) U.S. Cl. .............. 709/200; 709/220; 709/221; 709/223; 709/224; 709/225; 709/206; 370/229; 370/232

(58) Field of Classification Search ......... 709/220–226; 370/229, 232
See application file for complete search history.

(56) References Cited

U.S. PATENT DOCUMENTS

| | | | | |
|---|---|---|---|---|
| 5,812,529 A * | 9/1998 | Czarnik et al. | ............ | 370/245 |
| 5,838,919 A * | 11/1998 | Schwaller et al. | ........... | 709/224 |
| 5,862,335 A * | 1/1999 | Welch et al. | ................ | 709/224 |
| 5,878,420 A * | 3/1999 | de la Salle | .................... | 707/10 |
| 5,893,905 A | 4/1999 | Main et al. | | |
| 6,049,779 A | 4/2000 | Berkson | | |
| 6,243,747 B1 * | 6/2001 | Lewis et al. | ................. | 709/220 |
| 6,363,053 B1 * | 3/2002 | Schuster et al. | ............. | 370/230 |
| 6,363,477 B1 * | 3/2002 | Fletcher et al. | ............. | 713/151 |
| 6,430,623 B1 * | 8/2002 | Alkhatib | .................... | 709/245 |
| 6,490,290 B1 * | 12/2002 | Zhang et al. | ................ | 370/401 |
| 6,542,593 B1 * | 4/2003 | Bowman-Amuah | .... | 379/201.03 |
| 6,563,793 B1 * | 5/2003 | Golden et al. | ............... | 370/236 |
| 6,577,597 B1 * | 6/2003 | Natarajan et al. | ........... | 370/232 |
| 6,587,875 B1 * | 7/2003 | Ogus | .......................... | 709/223 |
| 6,745,242 B1 * | 6/2004 | Schick et al. | ............... | 709/224 |
| 6,873,600 B1 * | 3/2005 | Duffield et al. | ............. | 370/252 |
| 6,912,575 B1 * | 6/2005 | Swift et al. | ................ | 709/226 |
| 6,917,614 B1 * | 7/2005 | Laubach et al. | ............. | 370/392 |
| 6,993,021 B1 * | 1/2006 | Chuah et al. | ................ | 370/389 |
| 7,124,188 B2 * | 10/2006 | Mangipudi et al. | .......... | 709/226 |
| 7,464,163 B1 * | 12/2008 | Bantz et al. | ................ | 709/226 |
| 7,467,192 B1 * | 12/2008 | Lemler et al. | ............... | 709/223 |
| 2005/0182838 A1 * | 8/2005 | Sheets et al. | ................ | 709/226 |

* cited by examiner

Primary Examiner—Nathan J Flynn
Assistant Examiner—Joshua Joo
(74) Attorney, Agent, or Firm—Alfred A. Fressola; Ware, Fressola, Van Der Sluys & Adolphson LLP

(57) ABSTRACT

An automatic baselining process for business bandwidth measures business bandwidth as monitored by a plurality of bandwidth monitoring devices positioned throughout a networked environment. The process includes autodiscovery of the business bandwidth sources and sinks (destinations), autolearning application bandwidth and utilization therefrom, and autobaselining end-to-end bandwidth. Autopartitioning of the observed data and end-to-end top level service level agreements into specific component metrics is also possible.

40 Claims, 33 Drawing Sheets

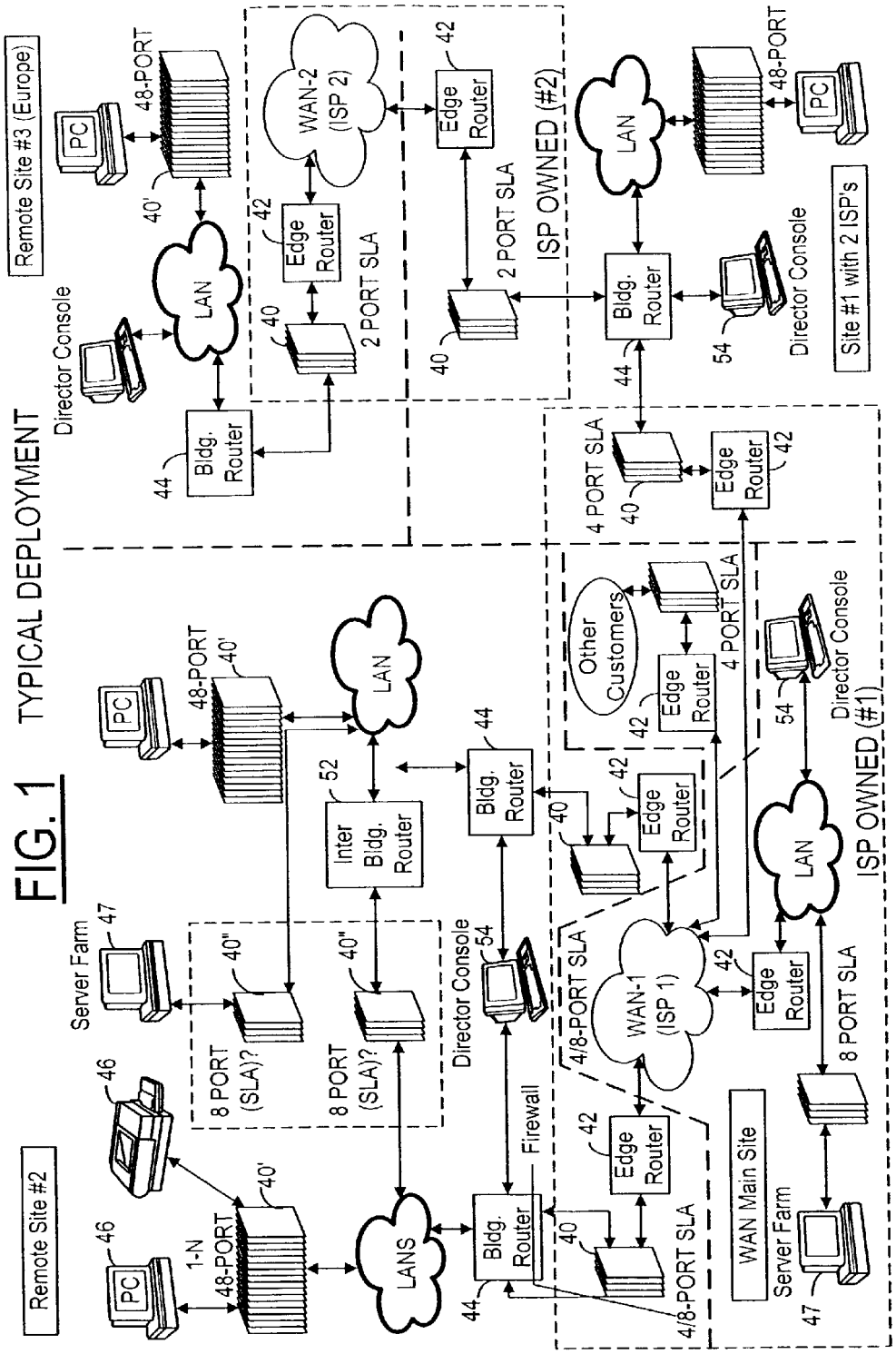
FIG. 1  TYPICAL DEPLOYMENT

Note: All buffers may be in a common buffer pool.

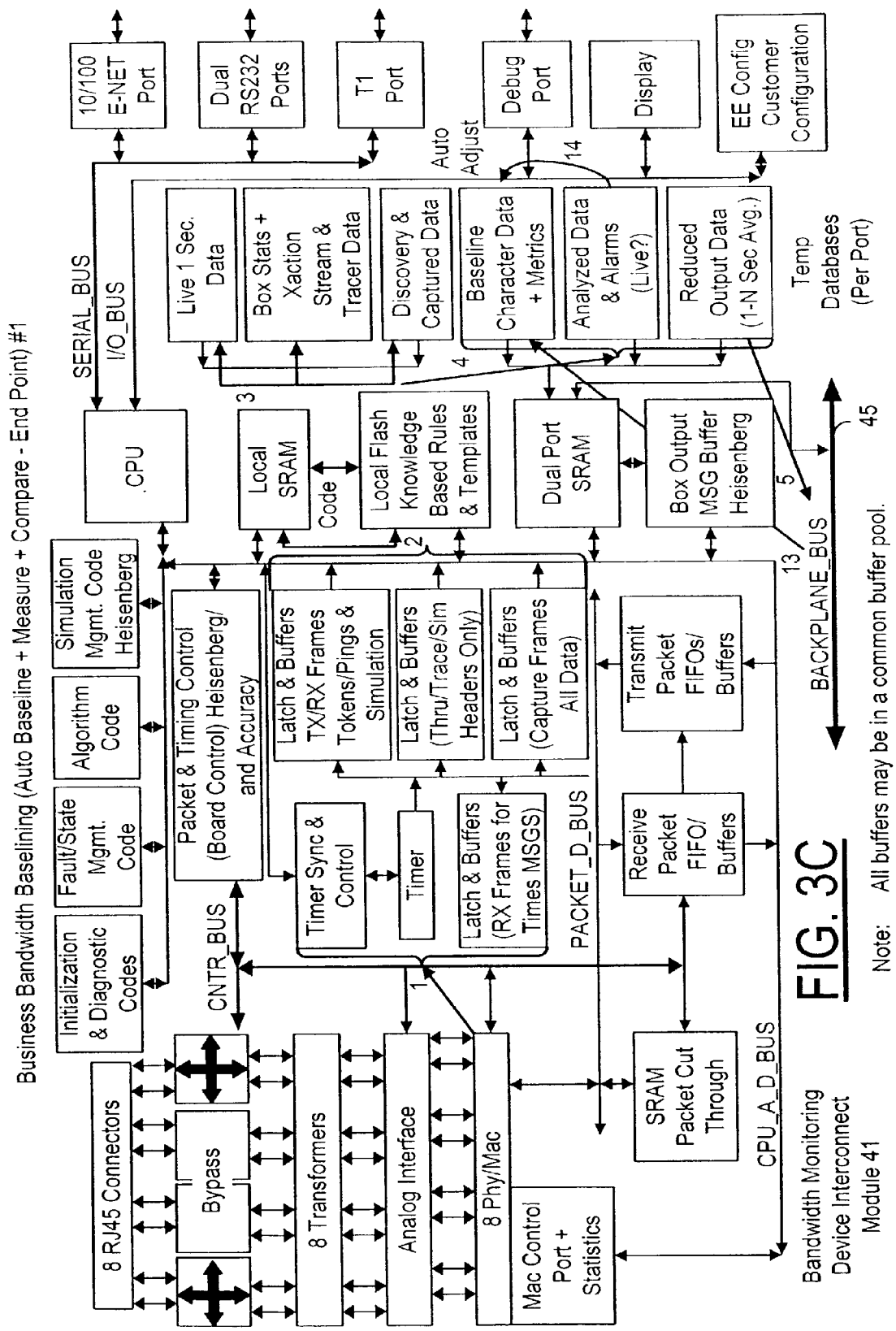

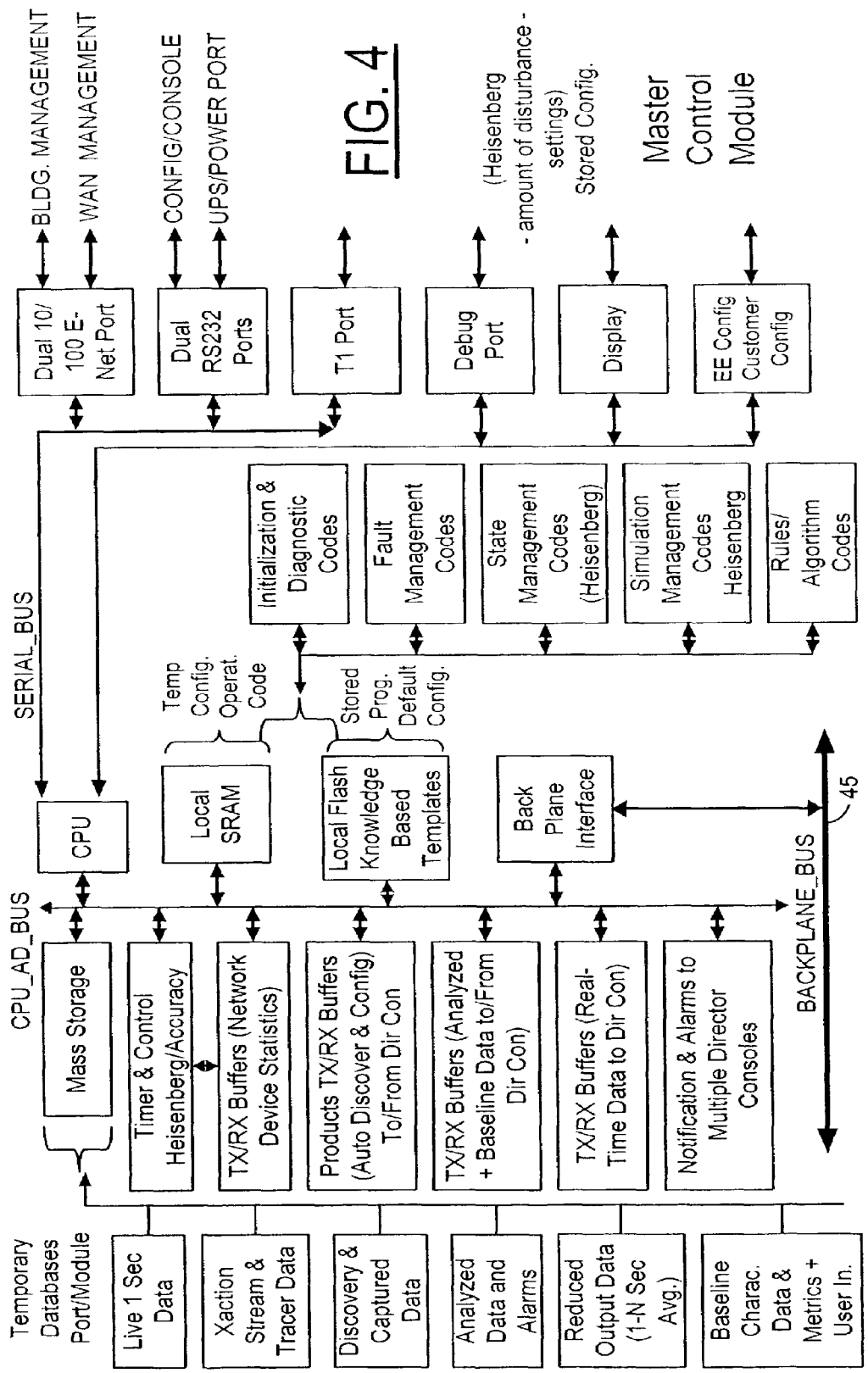

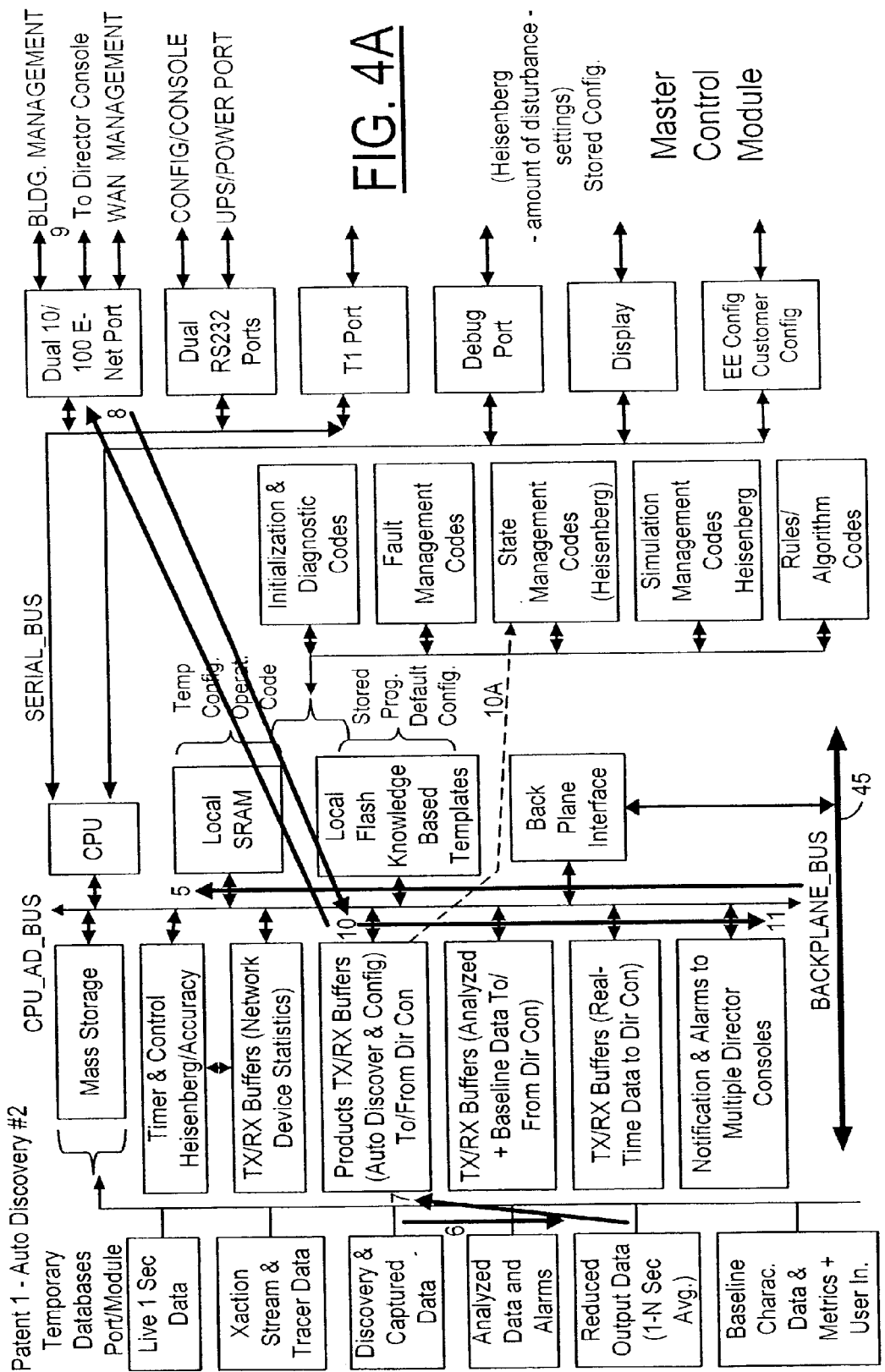

METHOD OF AUTOMATICALLY BASELINING BUSINESS BANDWIDTH

CROSS REFERENCE TO RELATED APPLICATIONS

This application is a continuation of International Application No. PCT/US01/05119 having an international filing date of Feb. 16, 2001, and from which priority is claimed under all applicable sections of Title 35 of the United States Code including, but not limited to, Sections 120, 363 and 365(c), and which in turn claims priority under 35 USC §119(e) to U.S. Provisional Patent Application Ser. No. 60/183,701 filed on Feb. 18, 2000.

The present application discloses subject matter which is disclosed and may be claimed in the following international applications as identified by application Ser. Nos. 10/222,190, 10/222,211, 10/222,193 and 10/222,210.

Application Ser. No. 10/222,190 is directed to active monitoring of business bandwidth. Application Ser. No. 10/222,211 is directed to analysis of business bandwidth for control of same. Application Ser. No. 10/222,193 is directed to the application of closed loop control to control of business bandwidth.

Application Ser. No. 10/222,210 is an extension of Ser. Nos. 10/233,067, 10/222,190, 10/222,211 and 10/222,193 with respect to exportation of information in a multiple management environment (multiple users with different SLAs).

TECHNICAL FIELD

The present invention is directed to data networks and is particularly directed to applying close-looped methodologies for automatically identifying, measuring and baselining business bandwidth (metrics).

BACKGROUND ART

The above described metrics, or portions thereof, are used to form the basis of service level agreements (SLAs) between business bandwidth network providers and business bandwidth users. These providers can be internal to a company (Information Technology—IT—Departments) or external service providers that offer a wide range of business bandwidth services to their customers. (See FIG. 1—Typical Deployment—for an example of a customer site—also showing the deployment model for implementing the present invention.)

Various methods have been attempted to perform functions required for automatically identifying, measuring and baselining business bandwidth. Prior service level agreement monitoring does not automatically identify, measure and baseline business bandwidth in a manner as described and implemented in the present application.

DISCLOSURE OF THE INVENTION

The principal purpose of this invention is to create a closed loop process that automatically matches a network service provider's service offerings, accompanied with a recommended specific SLA to a customer's network needs.

The principal focus is directed to all types of IP based network services, including, but not limited to, Voice over IP, Video (on demand) over IP, storage over IP, queries and database access, and block VPS Internet browser transfer.

This closed loop process is accomplished by combining in substantially real-time the following processes:

Autodiscovery of network services by parsing and aggregating network traffic against predefined service offering templates.

Autolearning of specific utilization and performance characteristics of the aggregated traffic.

Based on predefined service level agreement templates, and using the auto learned data for both customer traffic and service availability, specific SLA metrics (parameters) are selected.

In addition, autopartitioning procedures can optionally be implemented so as to take observed data and end-to-end SLA metrics and, utilizing network topology information concerning path, apportion these metrics to the specific component metrics (e.g., create a component SLA baseline/metrics).

Continually monitor observed traffic, determine if there is a change in either customer needs or ability to offer enhanced services, and make recommendations to change service offerings and SLA for customer.

There are specific key components required for characterizing business bandwidth. These components, when combined into a common methodology/process, make up the closed-loop process. A brief description of each component follows:

Autodiscovery

The ability to automatically locate and identify the business bandwidth sources and sinks that exist on the network (applications using business bandwidth, sometimes identified as application clients and application services e.g. those provided by Cisco, and Hewlett Packard's HPOpenView). There are multiple standard, industry accepted autodiscovery algorithms that can be used. The autodiscovery method basically captures (copies) the headers off every frame passing through a point in the network and analyzes those headers.

Autolearning (Profiling) (First Baseline)

Autolearning is the ability to observe and monitor the business bandwidth sources and sinks and learn about each of their utilization characteristics (type, statistical utilization, temporal utilization; examples: latency over time, throughput over time, burst capacity and duration, latency jitter with time stamp). Autolearning can be initially configured so that the user can accept and/or tune for more/less aggressive metrics.

Autocharacterization (Autobaselining)

The ability to translate the learned business bandwidth for each application and translate it into a total end-to-end business bandwidth profile, for any customer-defined end. The end-to-end business bandwidth profile is also known as the initial "SLA" (Service Level Agreement metrics). This algorithm for performing the baselining adds up the individual source and sink (destination) characterizations for any end point and translates them through knowledge-based modeling algorithms into a set of business bandwidth baselines (metrics).

Autopartitioning (Component Modeling)

The ability to apportion any/all of end-to-end baseline metrics among the components that make up/affect any end-to-end path. The partitioning algorithms can consist of a separate and distinct methodology/model. The models and partitioning algorithms reside in the Director Console. The Director Console utilizes the data gathered from all (SLA & Appliance) Tools, and other network management information (if available).

Thus the method of automatically baselining business bandwidth includes

Autobaselining of business bandwidth for both end-to-end and component to component (e.g., characterizing in one model both end-to-end and specific components that make up any end-to-end pathway). The end-to-end and component data are collected synchronously (at the same time), allowing for easy cause analysis.

Autobaselining that combines the four key business bandwidth components that can learn and tune itself without user input.

Autodiscovery of business bandwidth sources and sinks.

Autolearning of application bandwidth/utilization/performance.

Autobaselining of end-to-end bandwidth (algorithms to translate observed data into specific end-to-end top "SLA" metrics).

Autopartitioning algorithms/methodologies that take observed data and end-to-end top "SLA" metrics and apportion these metrics to specific component metrics (component "SLA" baseline/metrics).

BRIEF DESCRIPTION OF THE FIGURES

FIG. 1 is an overall diagrammatic representation of a typical deployment environment of the present invention in which various networks are interconnected for providing bandwidth necessary for implementing one or more service level agreements.

FIG. 3C illustrates the flow paths for business bandwidth baselining associated with the modules of the bandwidth interconnect module.

FIG. 4 is a block diagram of the master control module of the bandwidth monitoring device.

FIG. 4A is a block diagram similar to FIG. 4 illustrating a second portion of the autodiscovery method as it relates to the master control module.

BEST MODE FOR CARRYING OUT THE INVENTION

Figure 1A:
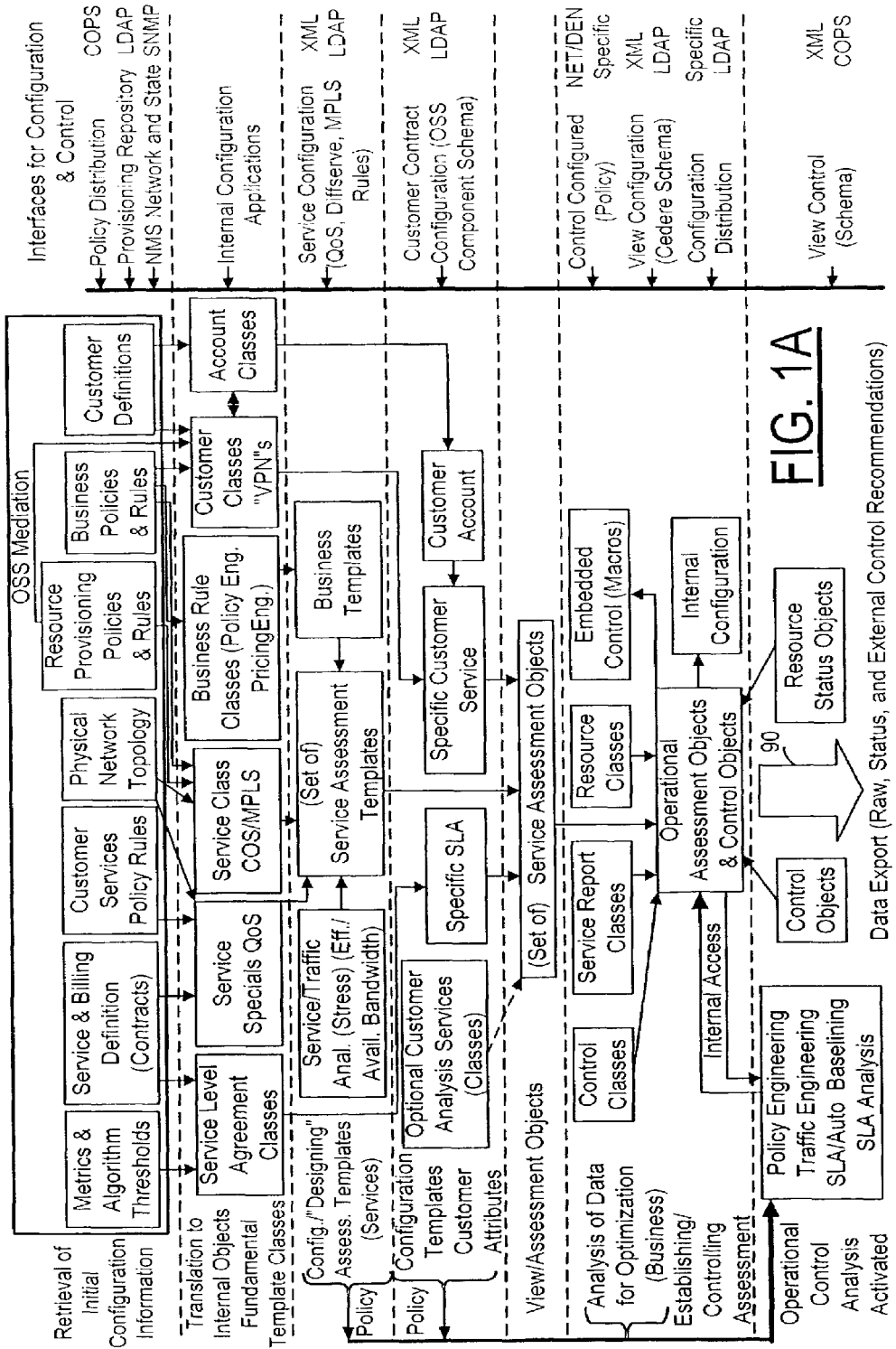
FIG. 1A is an overall flow chart showing the details of closed loop business bandwidth measurement and control.

As best seen in FIG. 1, a typical deployment of the present invention comprises a plurality of bandwidth monitoring devices 40, such as edge devices which are typically collocated with edge routers 42 and building routers 44. Edge routers (switch fabric) are typically deployed at the edge of one wide area network (WAN) associated with an internet service provider (ISP) or between a WAN and a local area network (LAN) as shown in FIG. 1 The edge devices (appliances) (bandwidth monitoring devices at the edge of different networks) are positioned so as to monitor bandwidth passing through an edge router typically to a building router 44 from whence the bandwidth is communicated through LANs, ultimately to one or more network enabled devices 46 such as PCs, printers and the like and/or to server farms 47. Depending upon the level of monitoring, a special type of bandwidth monitoring device such as a network enabled device bandwidth monitoring device 40 particularly suited for connection to network enabled devices 46 can be employed. Such monitoring devices typically are positioned between a LAN and a plurality of network enabled devices 46. In addition, server farm bandwidth monitoring devices 40 can be positioned between server farms 47 and LANs or interbuilding routers 52 as shown in FIG. 1.

Figure 3:
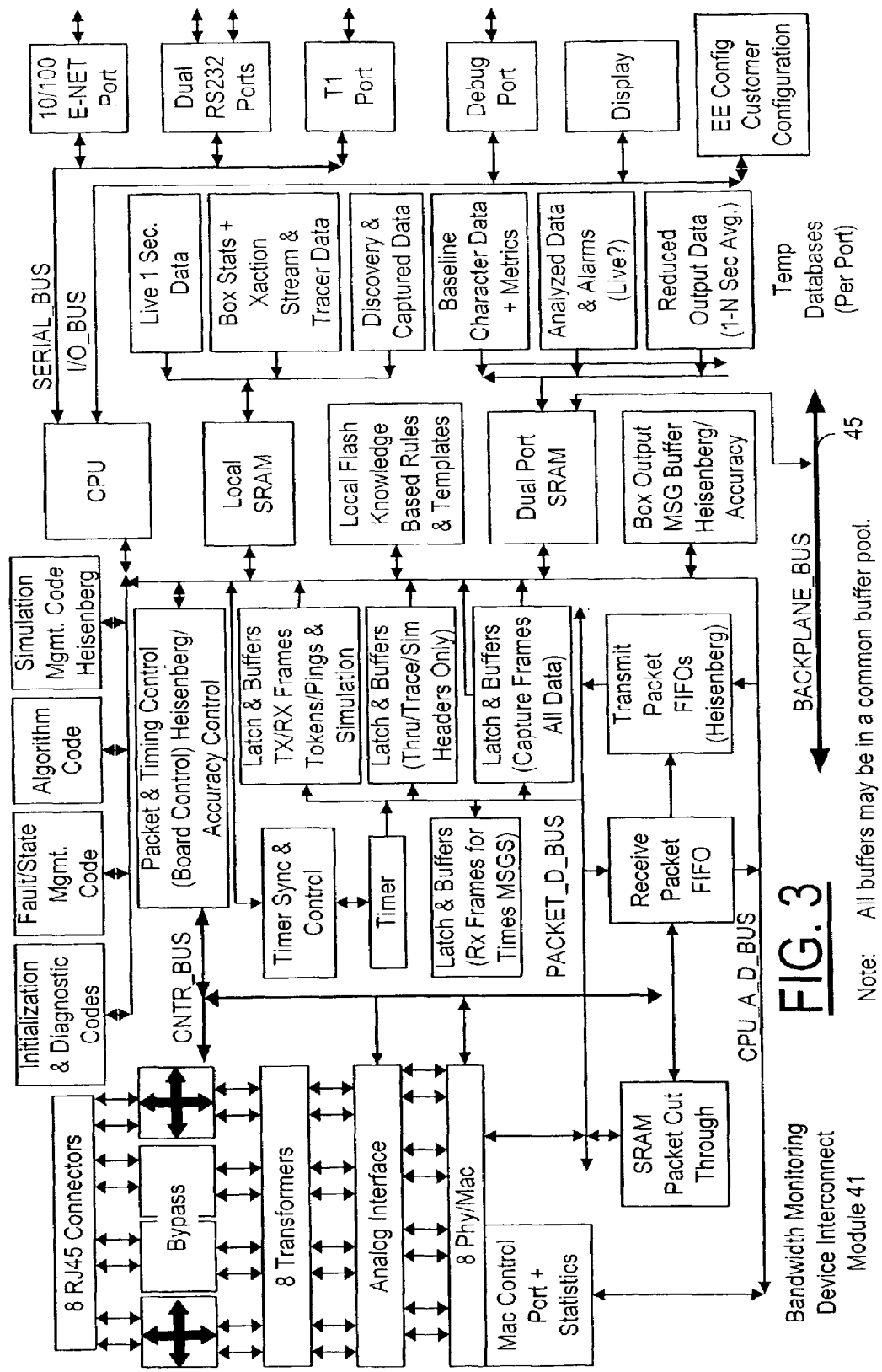
FIG. 3 is a block diagram of the bandwidth interconnection module forming part of a bandwidth monitoring device.

For the methods according to the present invention to be implemented, in addition to the various types of bandwidth monitoring devices, the present invention further includes one or more director consoles 54 which pool and further analyze the bandwidth data associated with the bandwidth monitoring devices. It should be noted that FIG. 1 is a typical deployment associated with the methodologies according to the present invention. Limitless other variations can be contemplated. The underlying concept however is for the bandwidth monitoring devices to be associated at locations where communications from one network environment to another is desired to be monitored, such as between a WAN of an internet service provider and an edge router interfaced to a building router associated with an office building and the like. As seen in FIG. 4E, each bandwidth monitoring device 40 includes a bandwidth interconnecting module 41 as shown in FIG. 3 and a master control module 43 as shown in FIG. 4. The master control module can communicate with one or more bandwidth interconnecting modules via backplane bus 45.

The present invention is directed to data networks and is particularly directed to applying close-looped methodologies for automatically identifying, measuring and baselining business bandwidth (metrics). These metrics, or portions thereof, are used to form the basis of service level agreements (SLAs) between business bandwidth network providers and business bandwidth users. These providers can be internal to a company (Information Technology—IT—Departments) or external service providers that offer a wide range of business bandwidth services to their customers. (See FIG. 1—Typical Deployment—for an example of a customer site and deployment model for products implementing this patent.)

Hardware and Software Modules

FIG. 1A is an overview of the closed loop business bandwidth measurement and control that are implemented by the present invention. As seen in FIG. 1, the overall system comprises multiple bandwidth monitoring devices 40 and one or more director consoles 54. Within this hardware are software modules that can be configured to perform multiple closed loop control procedures for configuring, managing and controlling IP-based network product offerings. IP-based network product offering are typically managed utilizing a collection of management tools generally focused on monitoring and analyzing network components (routers, cables, etc.). These network components provide basic resources for a service provider's offerings; however the management system does not have the capability of running in real time, continually monitoring specific network service traffic (for any pathway or for any specific individual customer).

The key modules of the present invention can be categorized as follows:

OSS (service providers network and service management system) Mediation Applications that interface to the OSS management systems and extract key customer, service, business and network resource configuration information, placing it into configurable files within the bandwidth monitoring devices 40. This data is usually located in the NMS (Network Management System), policy (service rules and procedures), provisioning (network component configuration tools), and billing systems' repository/databases, and can be accessed by industry standard protocols; LDAP, COPs, SNMP.

Configuration applications that transform configuration files into specific object classes and rules, focusing on the following:

Service level agreement class (specifically customer utilization, performance and reliability metrics).

Specialized service offering class
        such as a gold, silver, bronze service offerings with different reliability, quality and performance managed offering.

Service class (file transfer, Internet browsing, voice, video, network storage types of traffic).

Business Rule Classes: (e,g, This month for voice, have 30% reserved overhead to reduce customer service faults and events. If service resource cut in half (a line breaks) voices gets ½, video gets ¼).

Customer class: description of how customer traffic will get monitored and analyzed.

Account class: (Example: If a resource gets cut to half, this customer priority and preference rules that allow this customer to get all of his/her service needs met, while another customer gets partial or no service).

Template configuration applications that take these classes of configuration information and transform them into specific monitoring and analysis templates. These templates identify specific traffic for monitoring, analysis rules and procedures to analyze traffic (including thresholds), storage rules, and alert/control procedures that will be executed for all traffic for specific unique service offerings and or specific customer traffic.

Control and distribution applications that, once a service monitoring and analysis template (i.e., service assessment object) is configured, distributes these templates (along with its service, customer, SLA and business templates) to the appropriate real-time data collection monitoring and analysis modules within the director console, for example. These modules collect then control the monitored modules, real world statistics (utilization, performance and effective available bandwidth) from those modules, compare the real-time data to specific data "points" (thresholds, limited) located in the fundamental "templates")e.g., perform preliminary utilization and performance analysis against SLAs and distribute the results).

Policy customer needs, and traffic engineering applications that further analyze monitored data against the predefined business rules. Those modules make change recommendations to the OSS system, identifying when specific service provisioning rules are not meeting current business rules and objectives. These results are then compared and then get further analyzed against predefined control templates which identify the appropriate course of action for export and control modules. Example: Send raw data, send state, send change control recommendations and/or change control directly to the router.

FIG. 1A presents further details concerning these modules and how the closed-loop business bandwidth measurements and control are performed. The data export 90 is the information that provides external control recommendations based upon these business bandwidth measurements. These recommendations can be automatically used to adjust business bandwidth to the network user or can be used to suggest changes to the business bandwidth.

In view of the above, there are specific key components required for characterizing business bandwidth. These components, when combined into a common methodology/process, make up the closed-loop process. (See FIG. 2 for a flowchart representation of the key components and how they interact to form the closed-loop process.) A brief description of each component follows.

Figure 2:
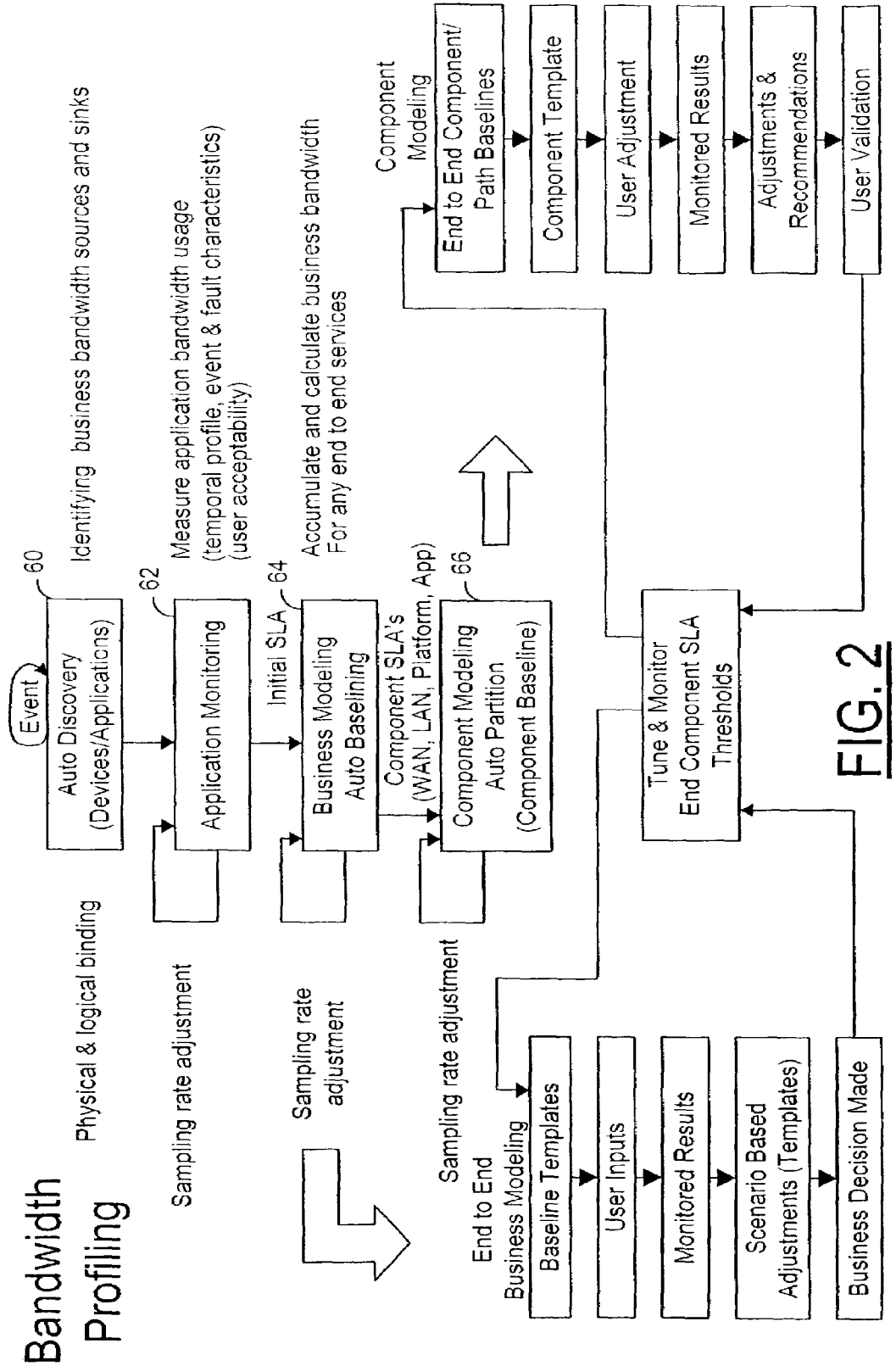
FIG. 2 is an overall flow chart illustrating the autodiscovery, application monitoring business modeling and component modeling forming part of the autobaselining and autopartitioning methods according to the present invention.

1.0 Autodiscovery 60 (see FIG. 2)

Autodiscovery is a process to automatically locate and identify the business bandwidth sources and sinks that exist on the network (applications using business bandwidth, sometimes identified as application clients and application services e.g. those provided by Cisco, and Hewlett Packard's HPOpenView). There are multiple standard, industry accepted autodiscovery algorithms that can be used.

Autodiscovery methods include the following components:

Identification of well-known port ID's for TCP and UDP connections. These port ID's are universally unique for each application type. (See generally *A Guide to the TCP/IP Protocol Suite*, Second Edition, Wilder, Floyd, Artech House, 1998)

Identification of COS (Class of Service) at Protocol Layer 2 (in header).

Identification of QOS and RSVP at Protocol Layers 3 and 4 (IPVG and standard TCP QOS).

The autodiscovery method basically captures (copies) the headers off every frame passing through a point in the network (e.g. via a 4 port edge appliance 40 shown in FIG. 1 and analyzes those headers to determine the following:

New application on the line (existing server).

New application on the line (new server).

New/additional events for any application.

The list of applications and clients for each application (saved).

The state of the application and client (connections observed by looking at header), (traffic still running on connection—header), (history and current)

Figure 3A:
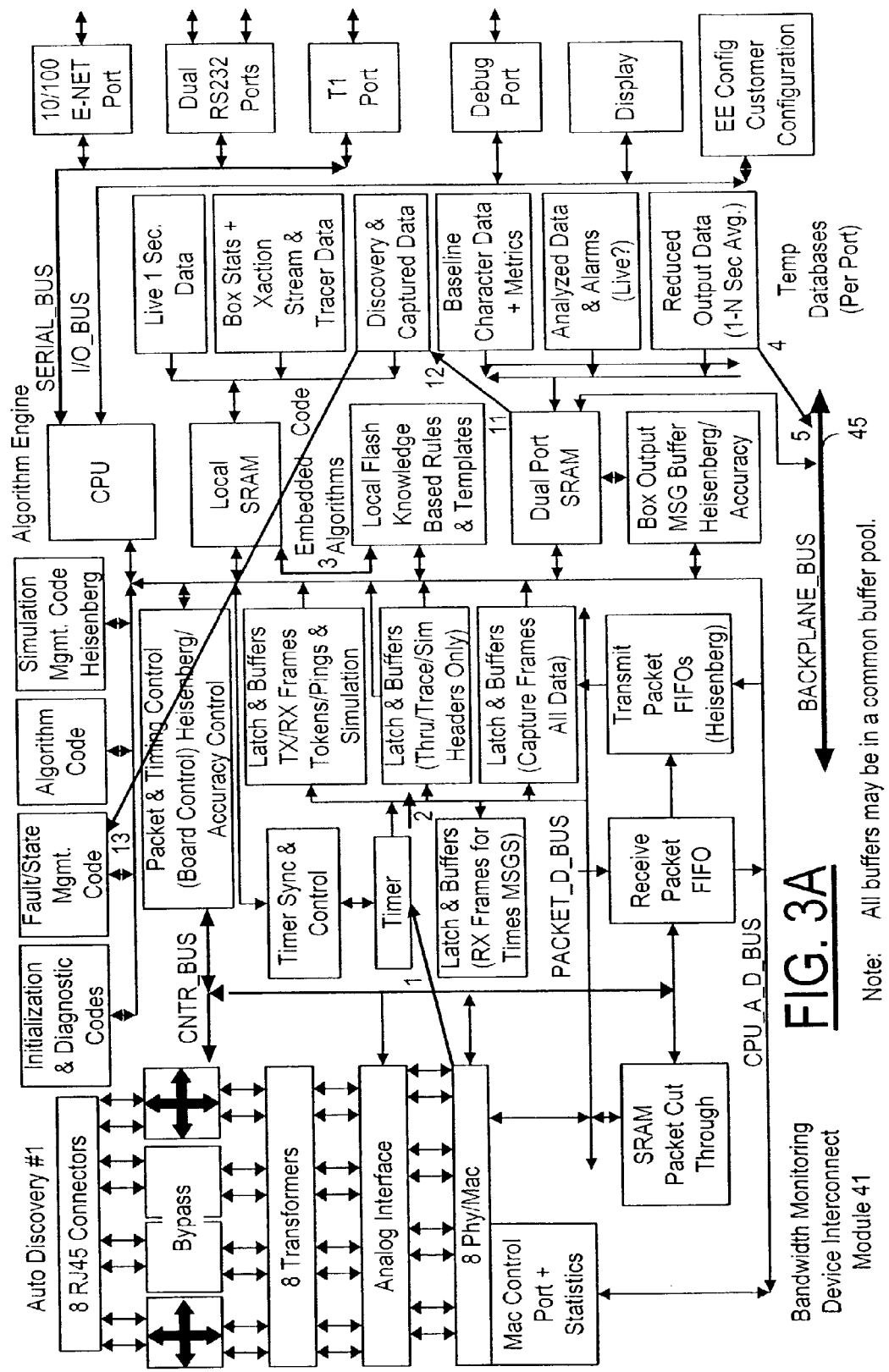
FIG. 3A is a block diagram similar to FIG. 3 with flow paths illustrating a first portion of the autodiscovery method according to the present invention as it relates to the bandwidth interconnecting module.

See FIGS. 3A and 4A for showing the flow paths associated with the autodiscovery process as it relates to the bandwidth interconnecting module 41 and the master control module 43 of the bandwidth monitoring device 40.

2.0 Autolearning (Profiling) (First Baseline) 62

Figure 3B:
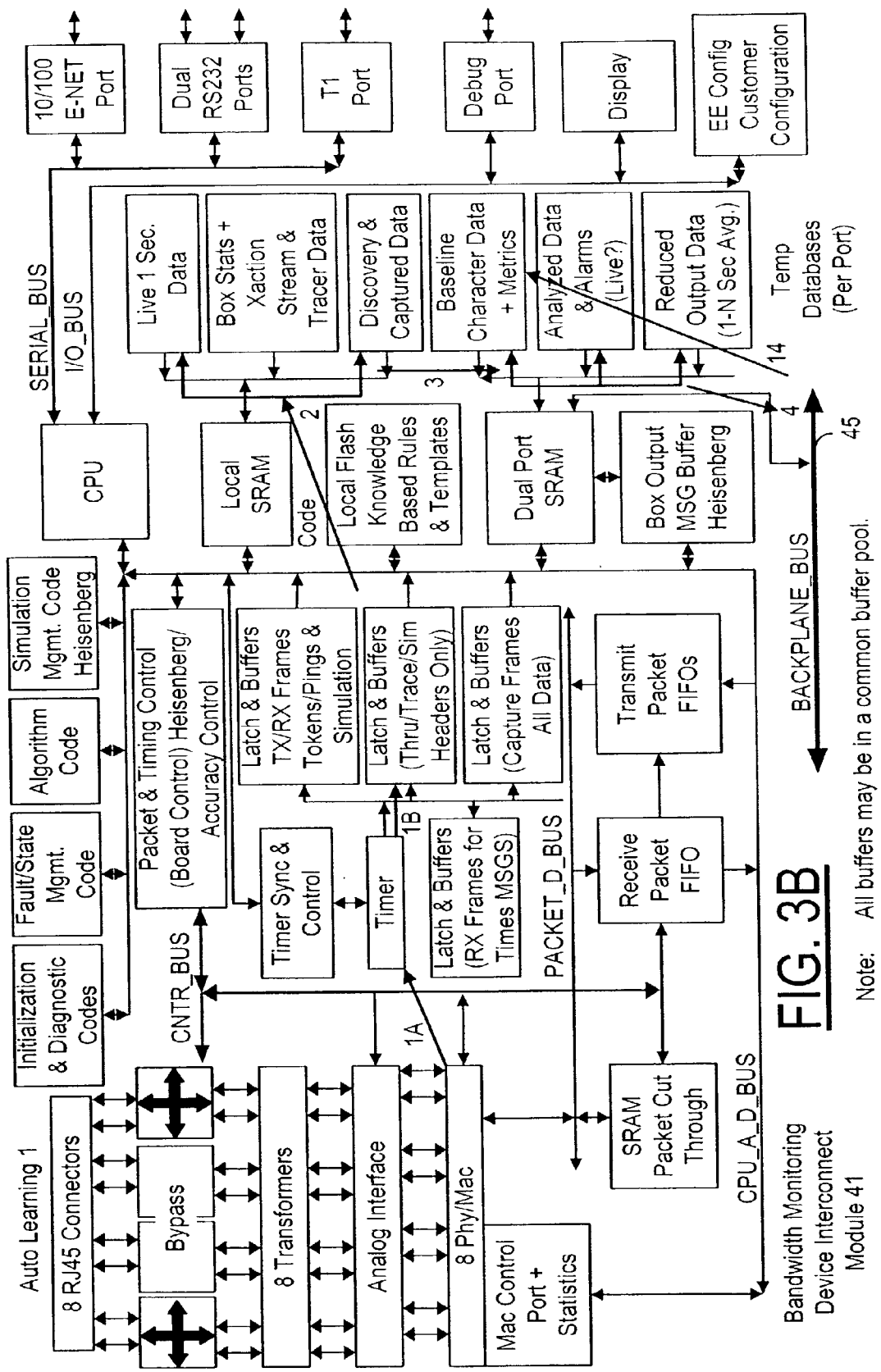
FIG. 3B illustrates the flow paths for autolearning associated with the modules of the bandwidth interconnect modules.
Figure 3D:
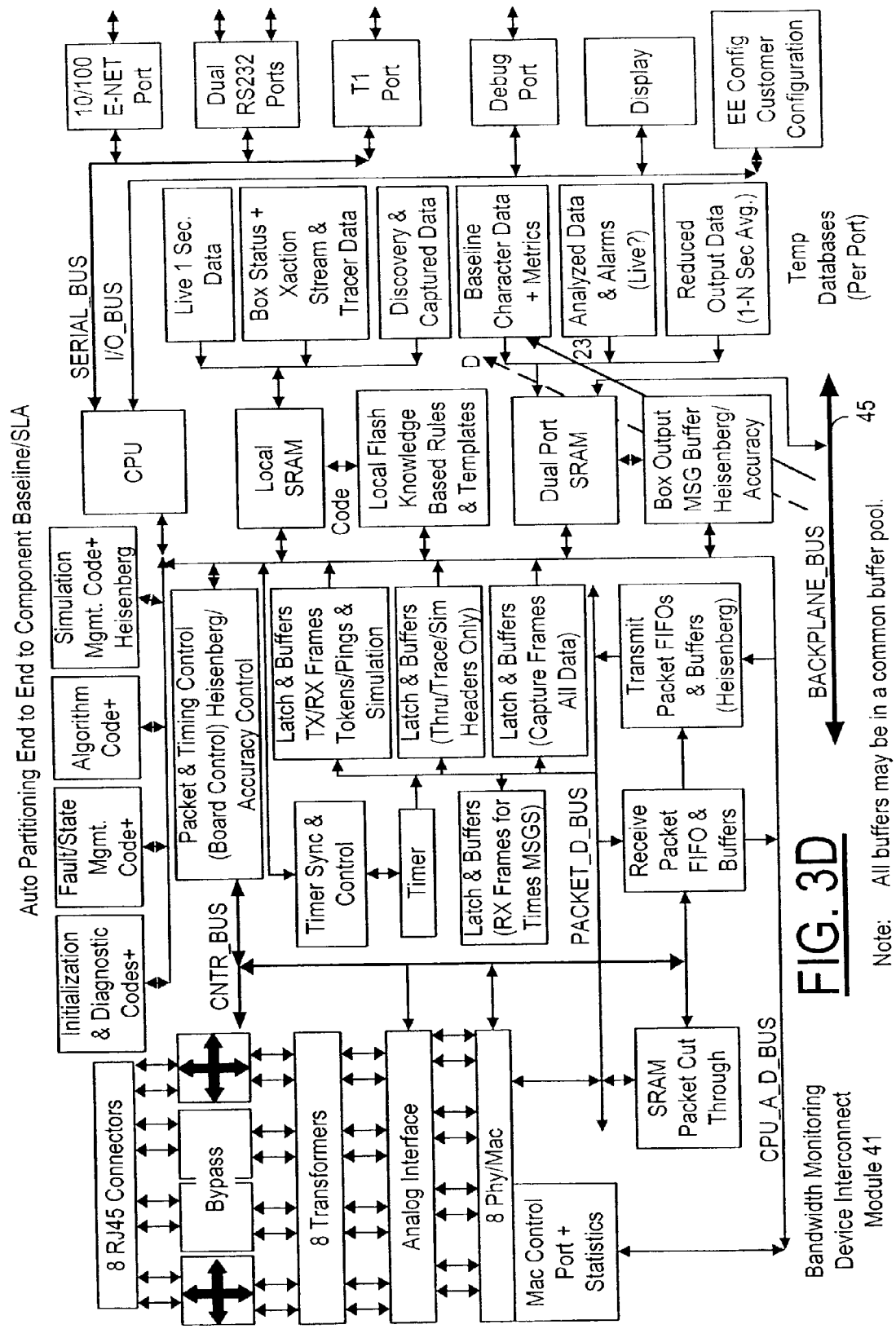
FIG. 3D illustrates the flow paths for autopartitioning end-to-end component baselining associated with the modules of the bandwidth interconnect modules.

Autolearning is the process observing and monitoring business bandwidth sources and sinks so as to learn about each of their utilization characteristics (type, statistical utilization, temporal utilization; examples: latency over time, throughput over time, burst capacity and duration, latency jitter with time stamp). Autolearning can be initially configured so that the user can accept and/or tune for more/less aggressive metrics. The quality of the learned profile is only as good as the accuracy (sample rate/real time) of the monitored data. A key part of the present invention is this high real time sample rate and validation of data. See FIGS. 3B and 4B that show the flow paths associated with the autolearning process as it relates to the bandwidth interconnecting module 41 and the master control module 43 of the bandwidth monitoring device 40.

Autolearning methods include the following timestamps:

Timestamp and copy the packet headers of messages passing through a location (e.g. the edge appliance) and identify which application, which server, and which client (in header data) is present.

Specifically monitor for the receipt of any new connection, break/disconnect, abort, or timeout on the connection and save this information in memory (a part is saved in SRAM).

Keeping an application's "running/sec" count of messages received/transmitted (saved in SRAM memory)

Analyzing applications that review the analysis data in SRAM for each application, server, client for performance metrics (looking at header and time).

Transaction count (protocol response and application response) (high, low, average/sec., average overall)

Transaction latency buckets and count for bucket (high, low, average/sec., average overall)

Transmit and receive message/data counts (store and specify prototypes/messages) (TCP/UDP/broadcast/multicast/ICMP . . . ) (high, low, average/sec., running average, burst).

Analyze applications that review the SRAM for tracer/streaming protocols and collect timestamps and unique header data for stream latency and latency jitter analysis (data stored in SRAM and transferred to dual RAM and then to master module mass storage (sec) and then transferred to Director Console storage (every/sec except when monitored (1 sec.)).

3.0 Autocharacterization (Autobaselining) 64

Autocharacterization (also called Autobaselining) is the process of translating the learned business bandwidth for each application into a total end-to-end business bandwidth profile, for any customer-defined end. The end-to-end business bandwidth profile is also known as the initial "SLA" (Service Level Agreement metrics). This algorithm for performing the baselining adds up the individual source and sink characterizations for any end point and translates them through knowledge-based modeling algorithms (Specific data collected and used for modeling algorithms (specific points, level of accuracy, sampling rate) and specific knowledge based algorithms that perform the business bandwidth end-to-end baselining and component partitioning) into a set of business bandwidth baselines (metrics). The definition of end point is dependent on a customer's perspective. Some options are:

The direct desktops and/or servers.

The specific user groups (individual, department, domain, or customer) no matter where they are located.

Specific physical groups (end point, subnet, building, floor) no matter which users are in that specific physical group.

This autolearning and autobaselining not only identify bandwidth utilization over time, but they also identify key performance metrics for each specific application. These performance metrics when collected for any end point (applications all added together) are included as part of the end-to-end baseline metrics.

The baselining of business bandwidth can also be described as a "process" flow. First, you start with application templates and modify them based on the observed size of the customer's site (Number of clients/servers). Then the network is observed for some period of time so as to develop "tuning" parameters to "adjust" the embedded templates to match the specific customer's site application usage/models.

These are called site specific (scenarios), based adjustments. This process allows the user to either accept and or modify each application's baselines (learned profile) and performance metrics.

Figure 4B:
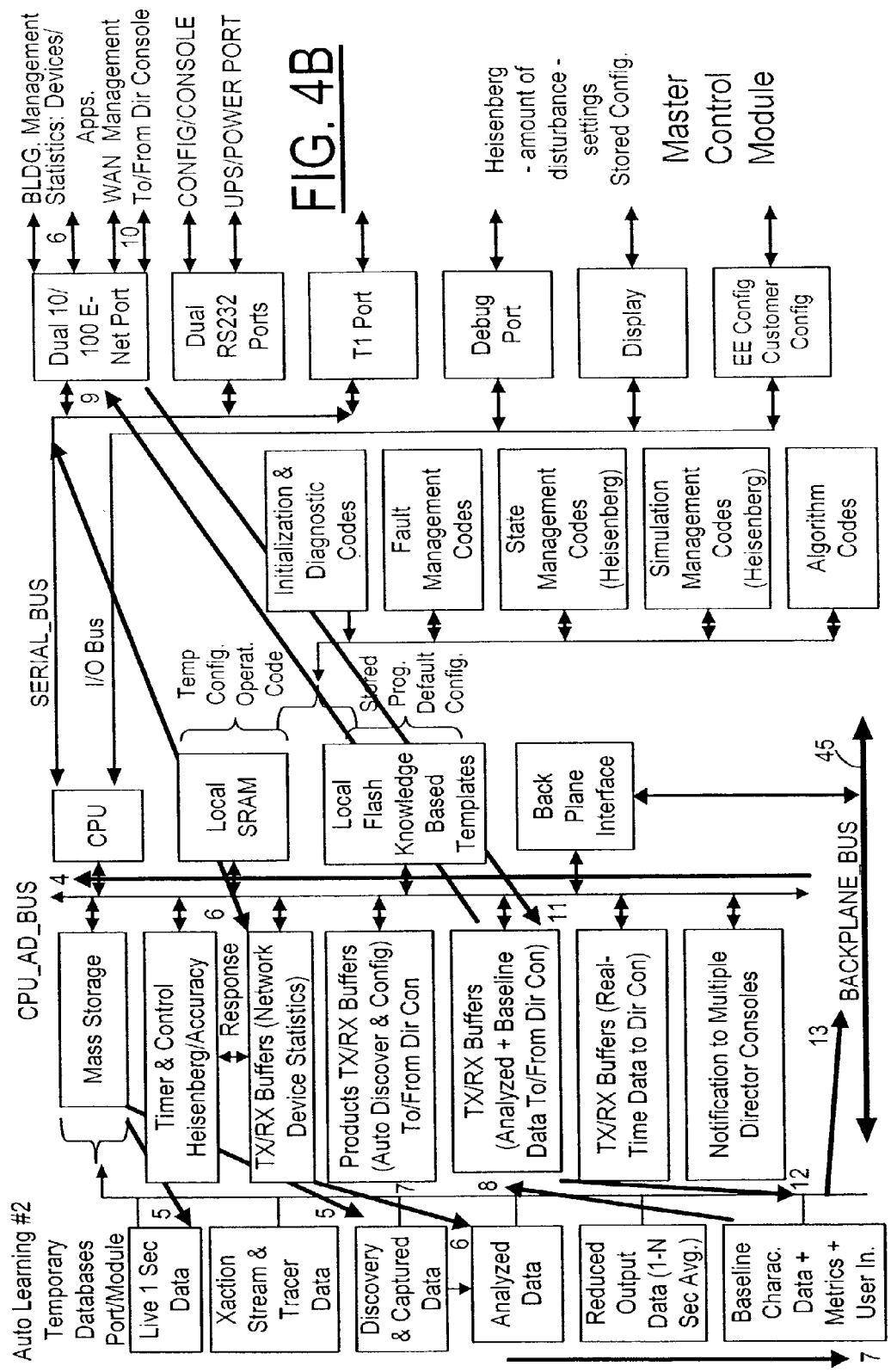
FIG. 4B illustrates the flow paths for autolearning associated with the modules of the master control module.
Figure 4C:
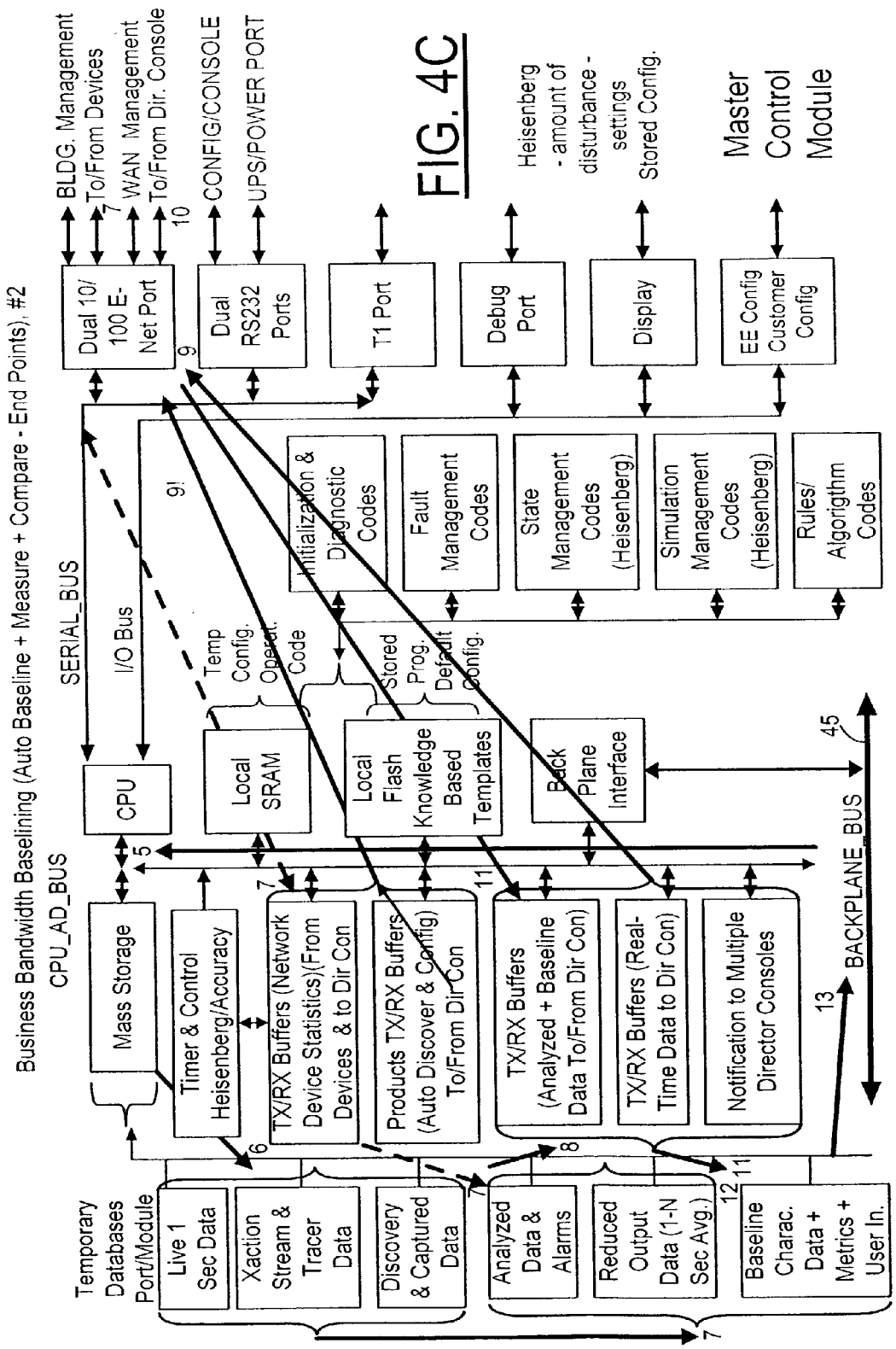
FIG. 4C illustrates the flow paths for business bandwidth baselining associated with the modules of the master control module.
Figure 4D:
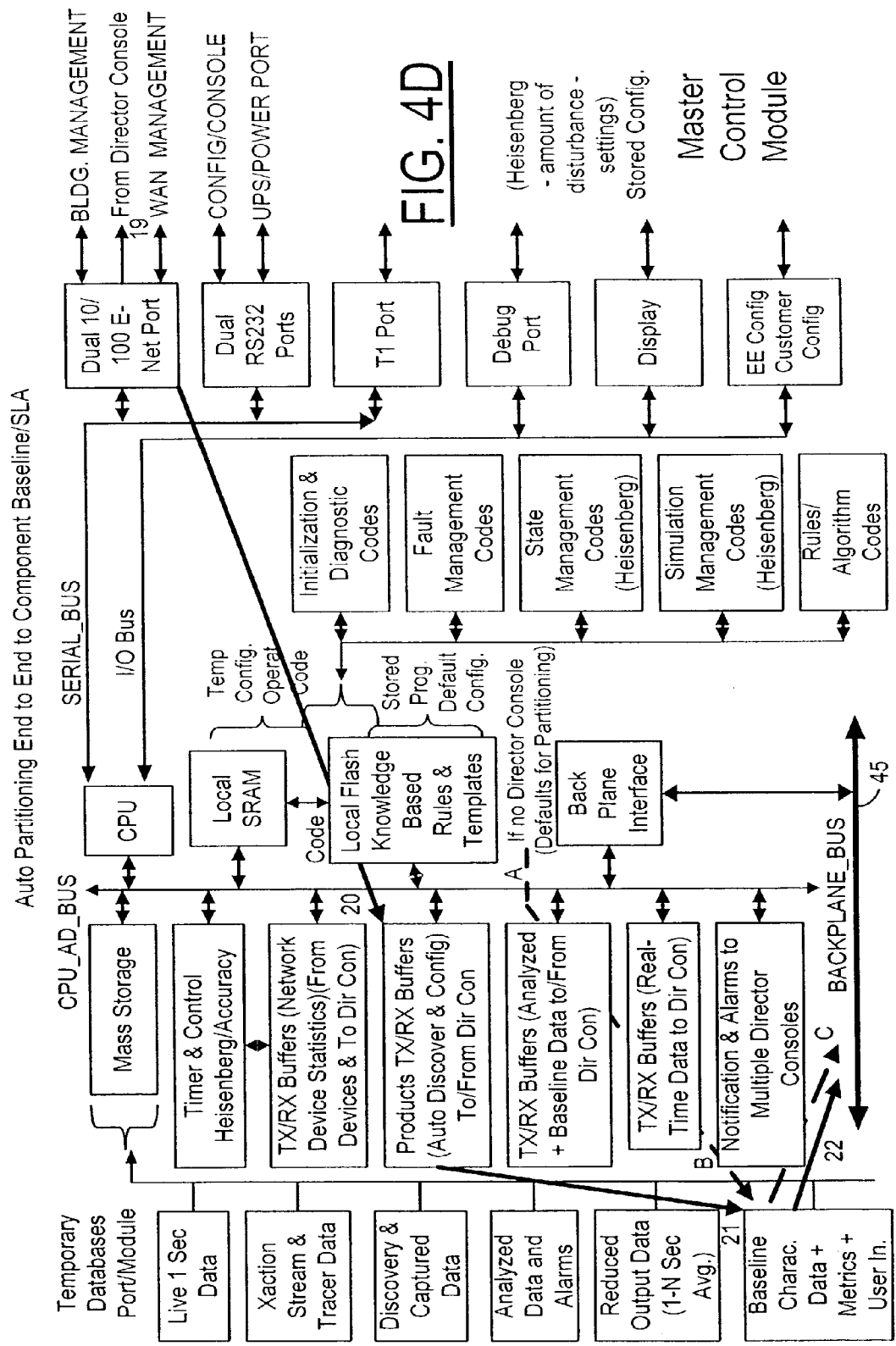
FIG. 4D illustrates the flow paths for autopartitioning end-to-end component baselining associated with the modules of the master control module.
Figure 4E:
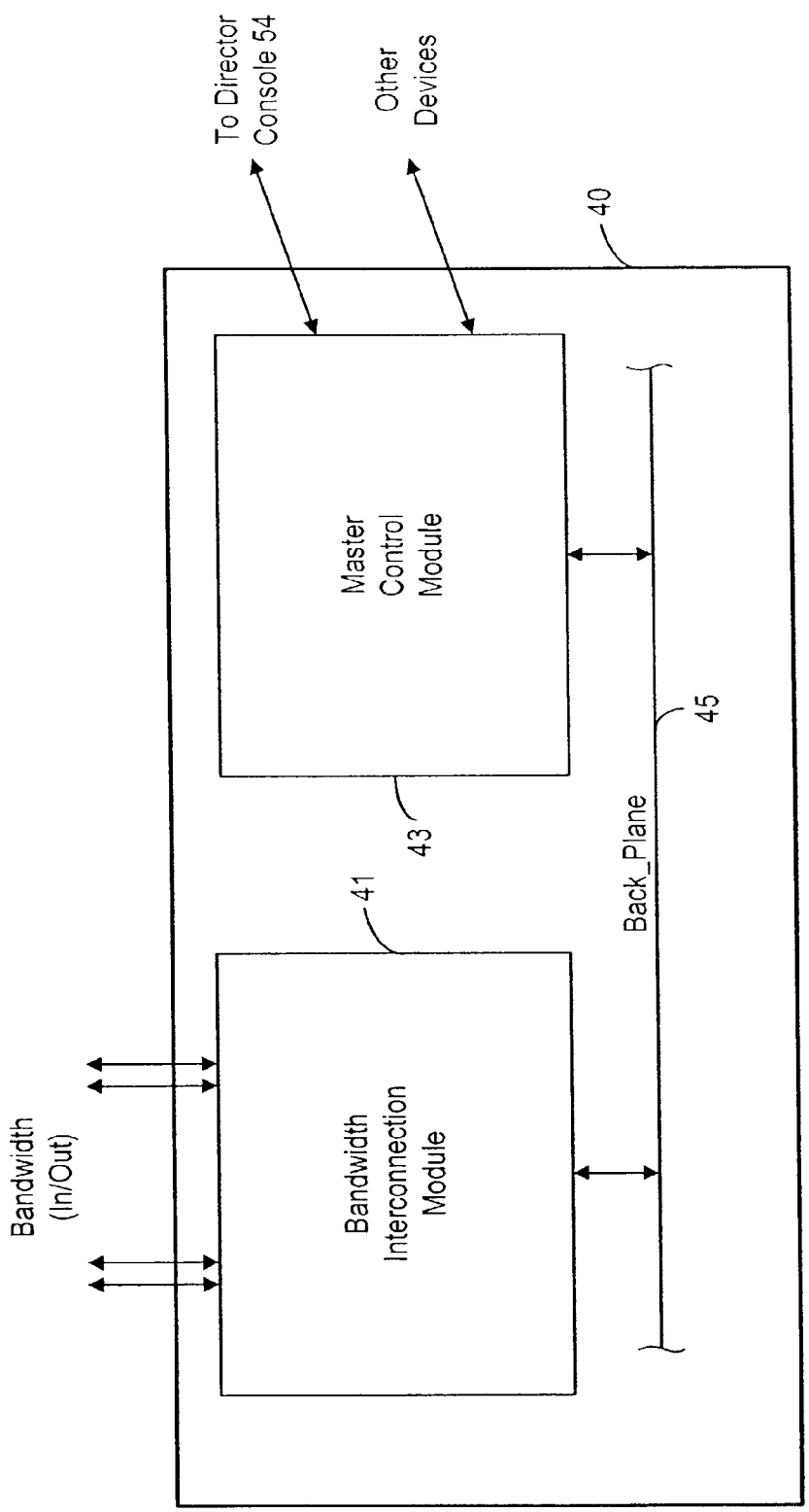
FIG. 4E is a block diagram showing how the bandwidth interconnect module and master control module are put together to form the bandwidth monitoring device.

*(See FIGS. 3C and 4C that show the flow paths associated with autobaselining (business modeling) process as it relates to the bandwidth interconnecting module 41 and the master control module 43 of the bandwidth monitoring device 40 for the methodology for autobaselining [business modeling].)

The specific processes/algorithms that translate new learned data into new/tuned baselines can be further described as follows:

3.1 Knowledge Based Baseline Templates

An initial set of embedded application baseline templates (in local flash) for adding up the specific types of applications (sources and sinks), the specific scales (number of) and specific system scopes (distributions, use characteristics, importance, priority).

3.2 Configuration Options

Either use defaults for each application, tailored for the yet to be observed scale, scope, and levels of priority (autolearning) or allow the user an opportunity to preselect and specify specific configuration parameters, including defining end-to-end groups. Also define first baseline observation period (e.g. sec., day, week).

3.3 Monitored Results

Accumulate monitored (auto learned) business bandwidth data and translate that data into specific analyzed metrics that may need to be modified (specific metrics that need to be changed or tuned to match new system needs. Example: Increase in end-to-end or specific WAN component bandwidth capacity)

3.4 Scenario-Based Adjustment/Recommendation

Make adjustment recommendations for specific changes to end-to-end baseline metrics. All recommendations would collect and display the following data:
Original baseline metric.
What has changed?
What new metric is needed?
Why is it needed?
The importance/urgency of the change.

3.5 Change Approval

Either the user has already given implicit permission (if not denied/accept), explicit permission (do all changes in these areas), or the user will determine whether or not to accept the recommendations. At any later point in time, the user may select to review unapproved recommendations and accept them. This implies recommendation history/logs with pertinent information saved as part of that log.

3.6 Performing the Change (Tuning)

The ability to modify the business bandwidth templates according to the user agreements and to log any and all changes to those templates. The important part of managing change in the baseline "thresholds" is to be able to identify when and why the change occurred.

See FIGS. 3C and 4C with respect to business bandwidth baselining (Auto Baseline+Measure+Compare–End Point) and FIGS. 5-12.

Figure 5:
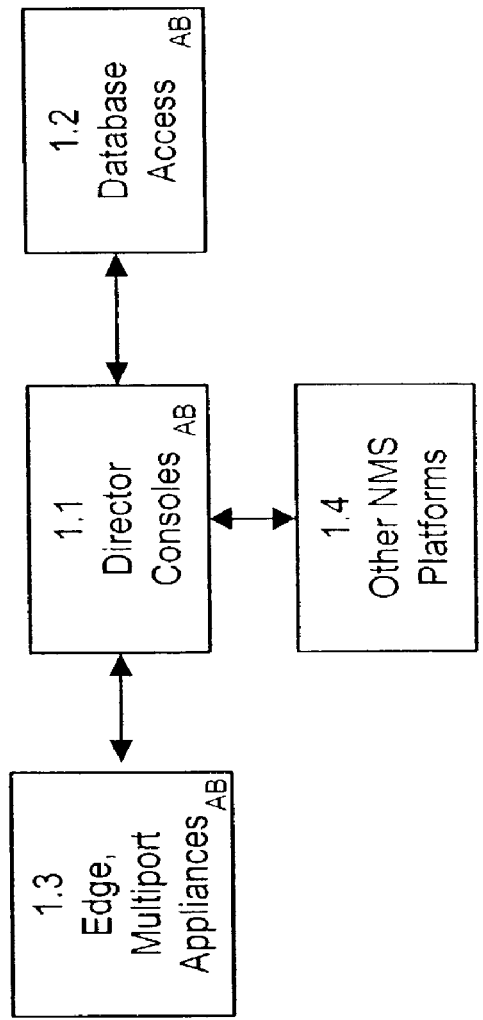
FIG. 5 is a high level block diagram of the director console according to the present invention with blocks used for business bandwidth baselining shown with lettering AB.
Figure 5A:
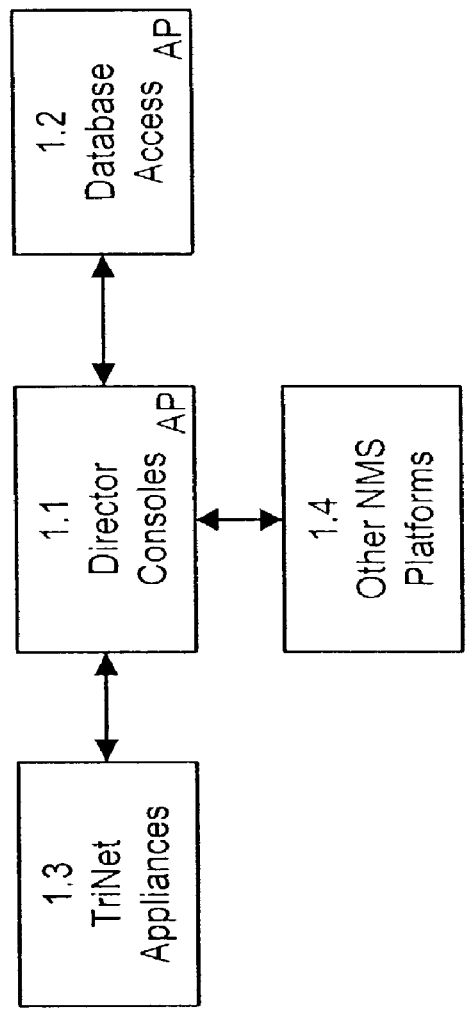
FIG. 5A is a high level block diagram of the director console, with modules associated with autopartitioning marked with lettering AP.
Figure 6:
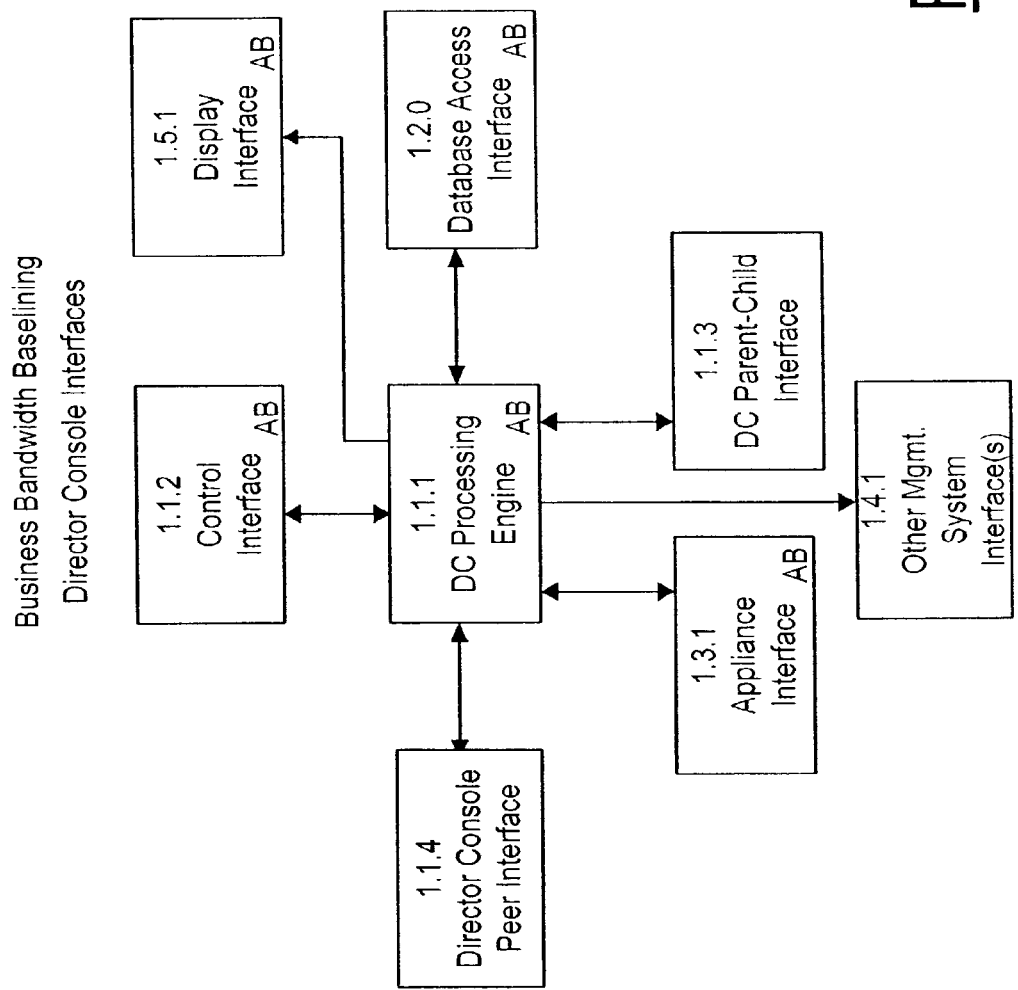
FIG. 6 is a block diagram of the director console interfaces with blocks used for business bandwidth baselining shown with letter AB.
Figure 6A:
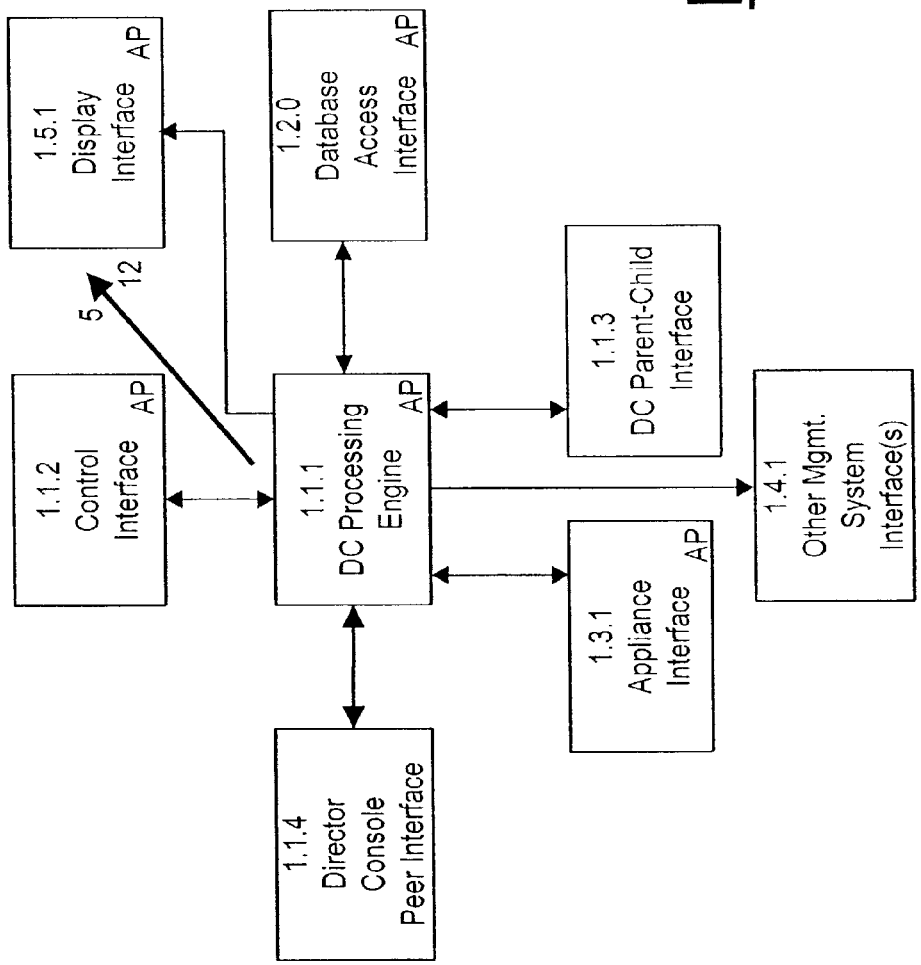
FIG. 6A is a more detailed block diagram of the autopartitioning, end-to-end to component baseline/service level agreement director console interfaces with modules associated with autopartitioning marked with lettering AP.
Figure 7:
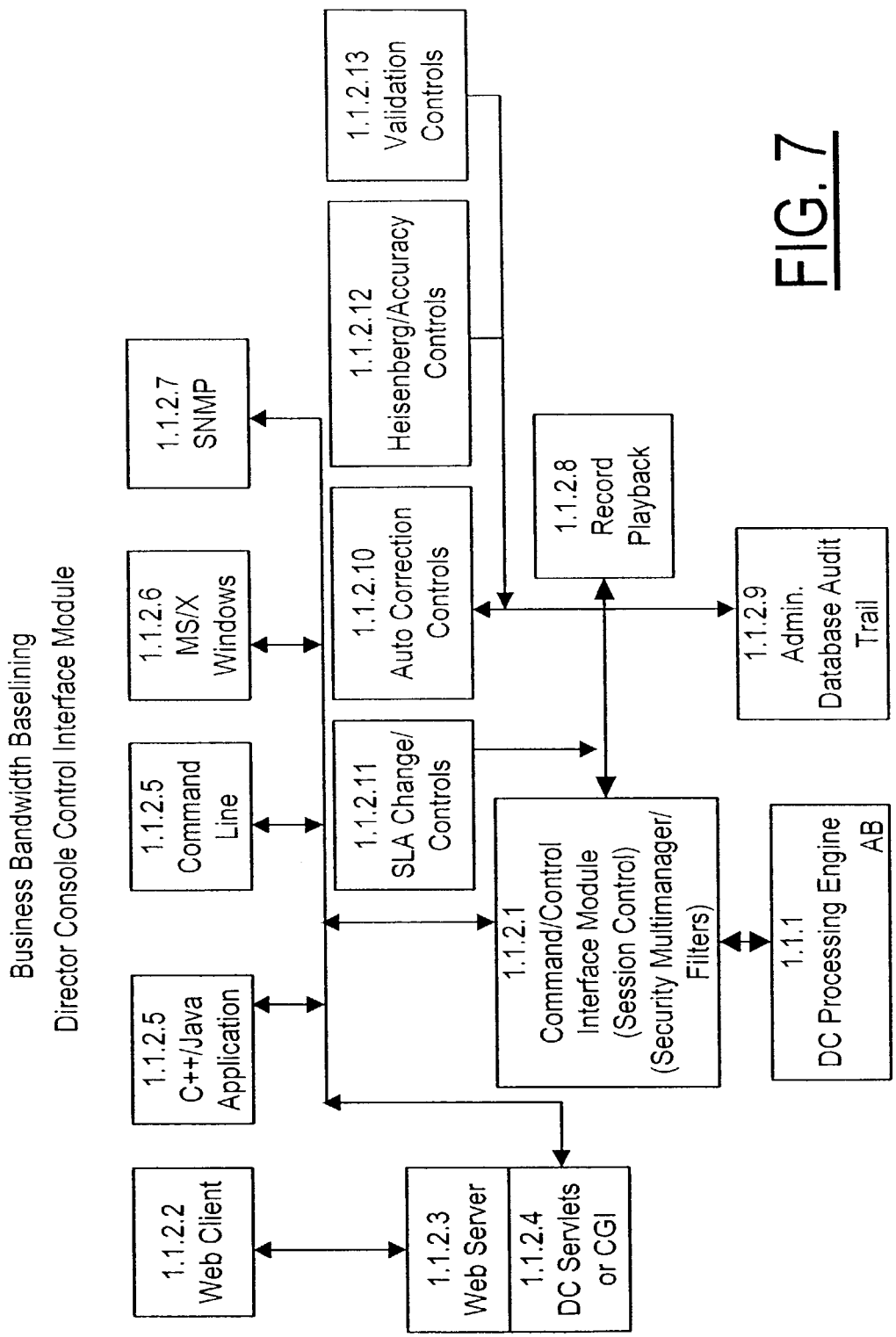
FIG. 7 is a block diagram of the director console control interface module, with blocks used for business bandwidth baselining shown with lettering AB.
Figure 8:
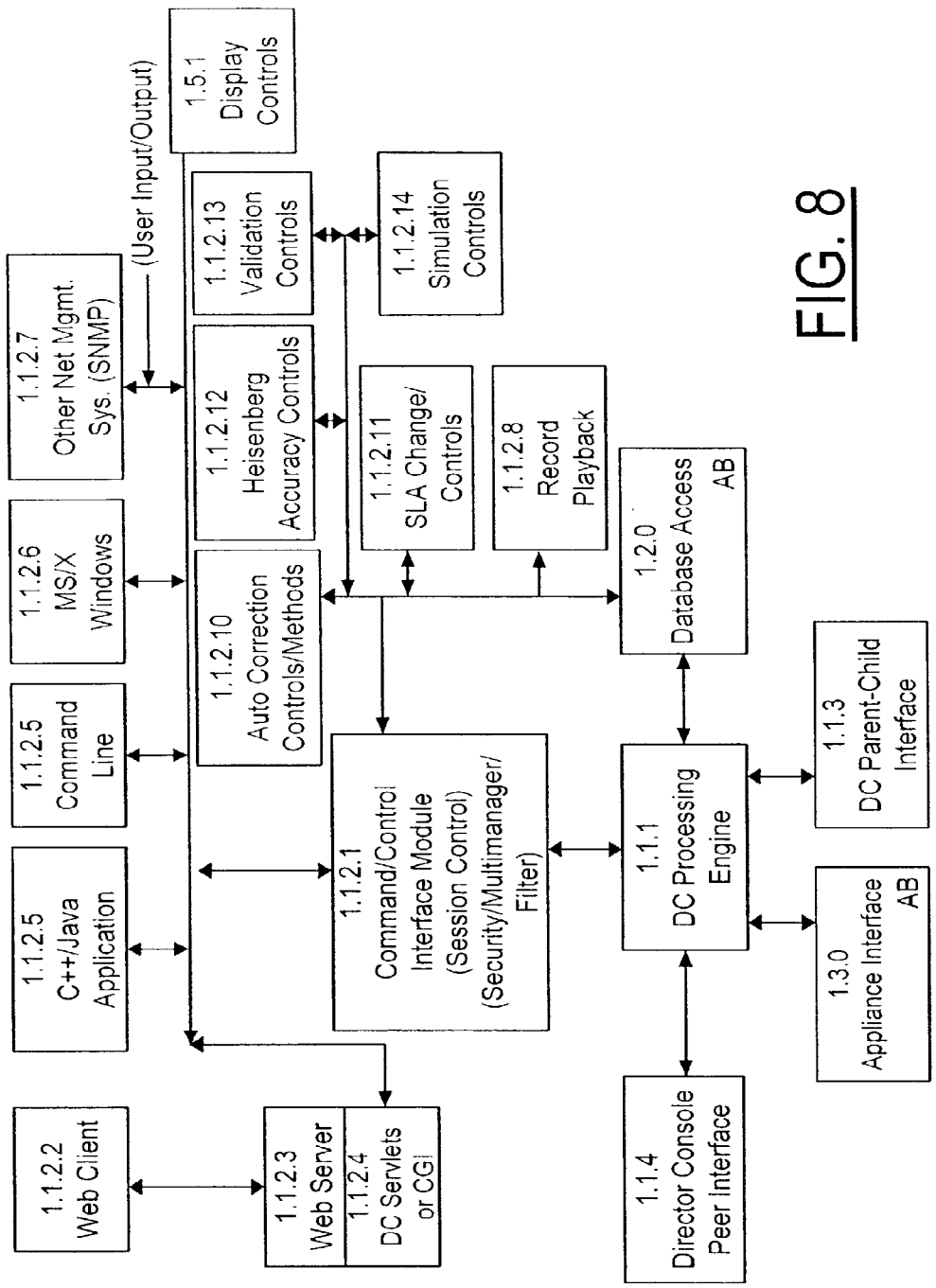
FIG. 8 is a block diagram of the director console control dataflow, with blocks used for business bandwidth baselining shown with lettering AB.
Figure 9:
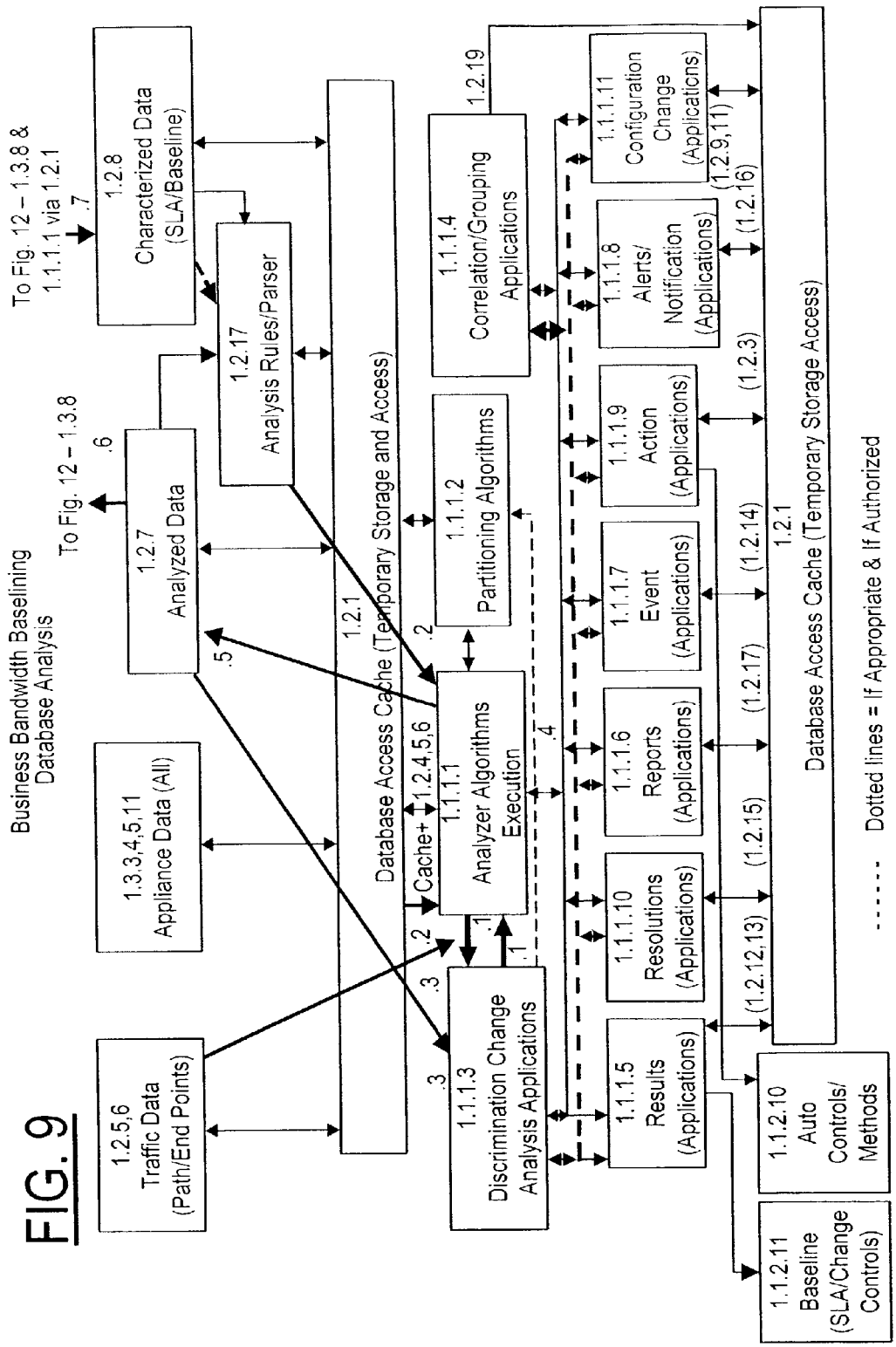
FIG. 9 is a block diagram and flow chart of the database analysis, including database analysis for the business bandwidth baselining according to the present invention.
Figure 10:
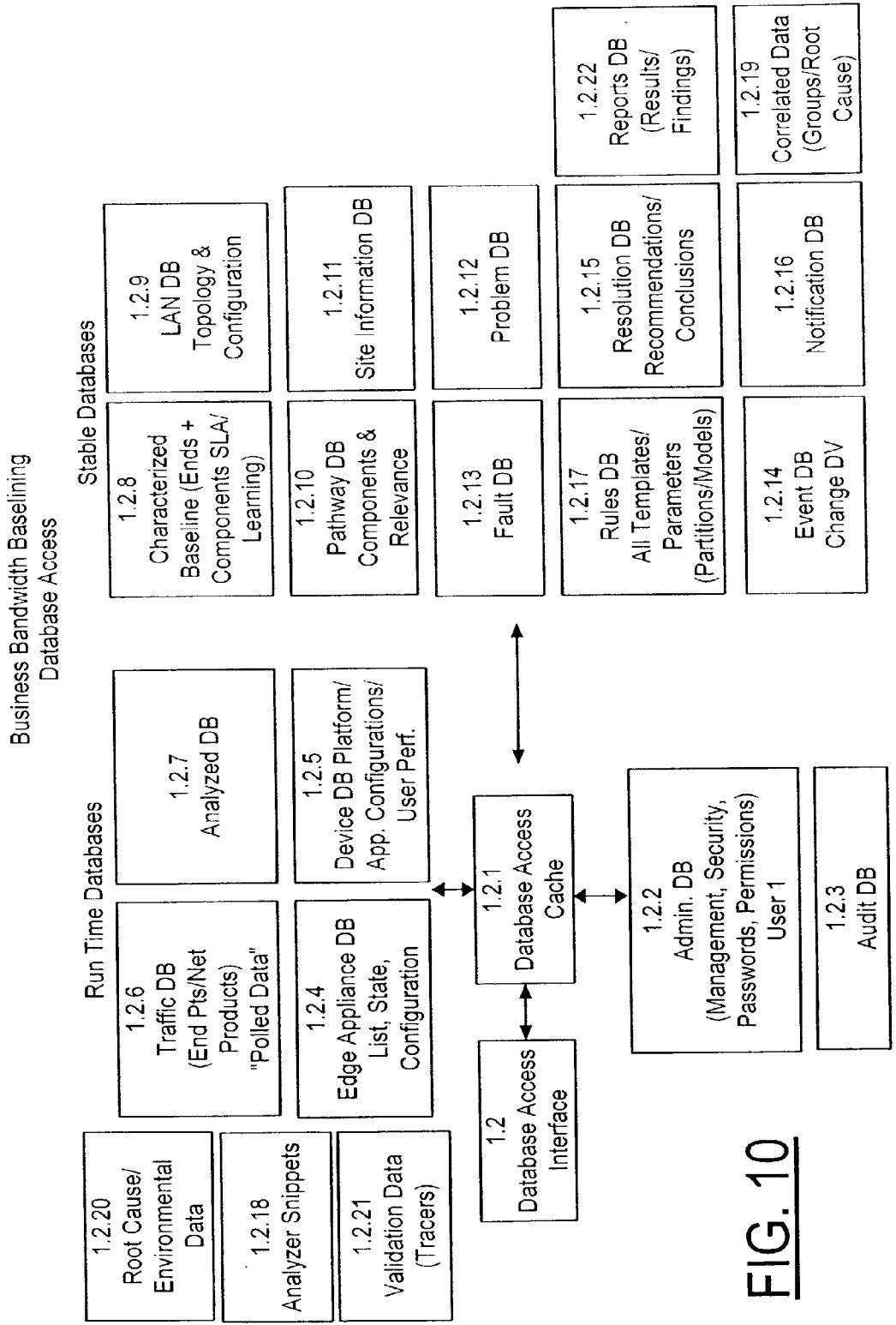
FIG. 10 is a block diagram of the database access, including database access for the business bandwidth baselining according to the present invention.
Figure 11:
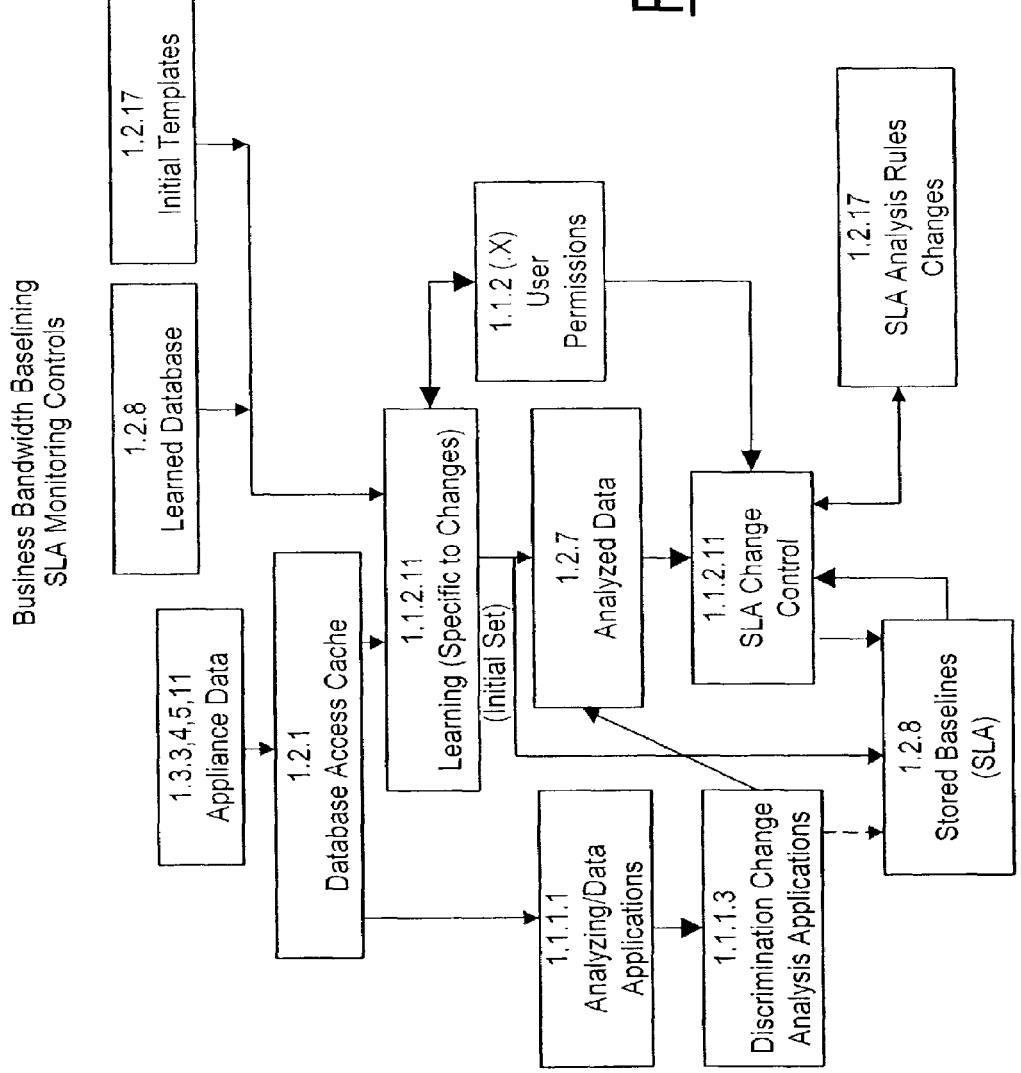
FIG. 11 is a block diagram of the service level monitoring controls for the business bandwidth baselining according to the present invention.
Figure 12:
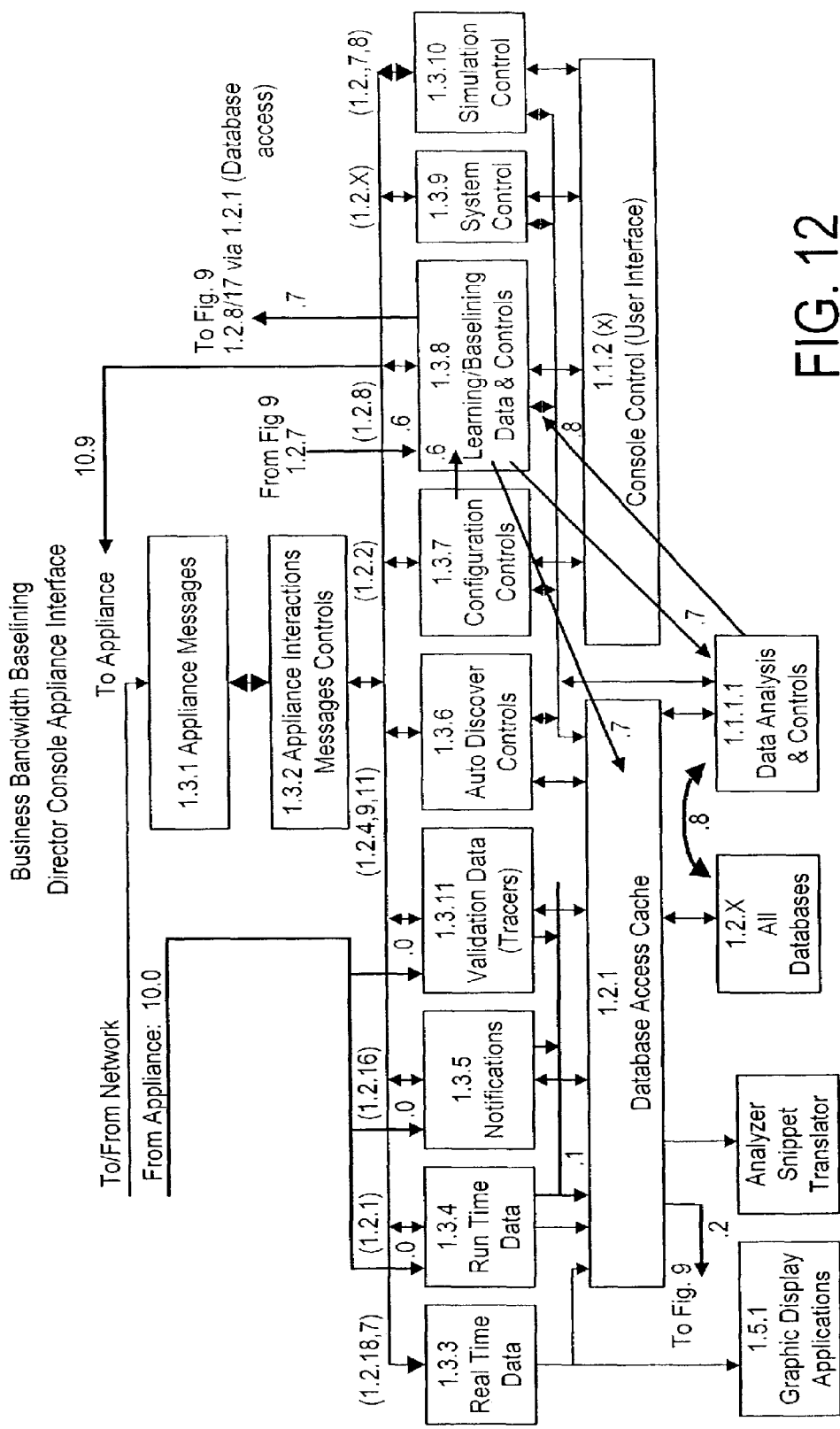
FIG. 12 is a block diagram and flow chart of the director console appliance interface for the business bandwidth baselining according to the present invention.
Figure 13:
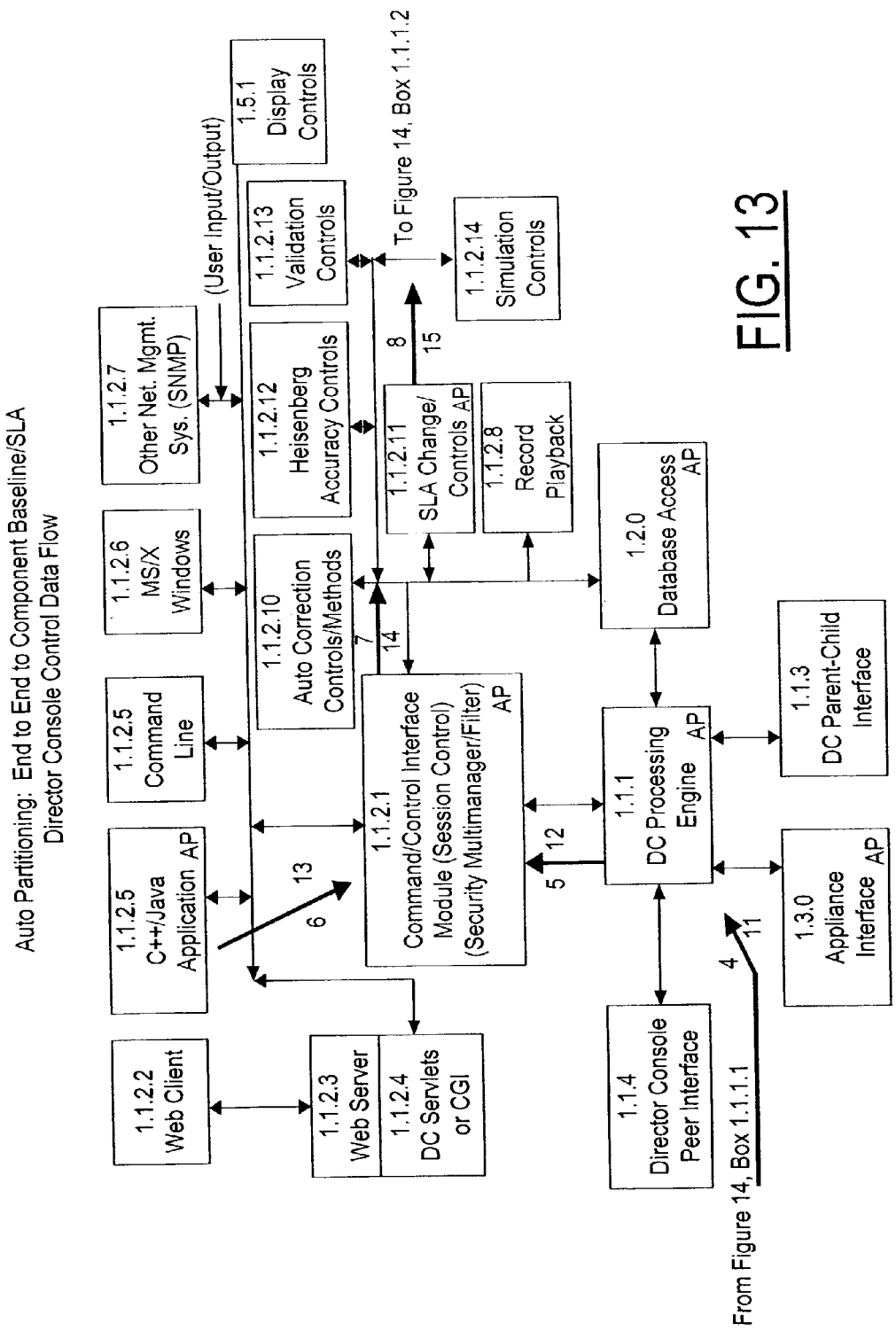
FIG. 13 is a block diagram of the autopartitioning, end-to-end component baseline/service level agreement director console control data flow, with modules associated with autopartitioning marked with lettering AP.
Figure 14:
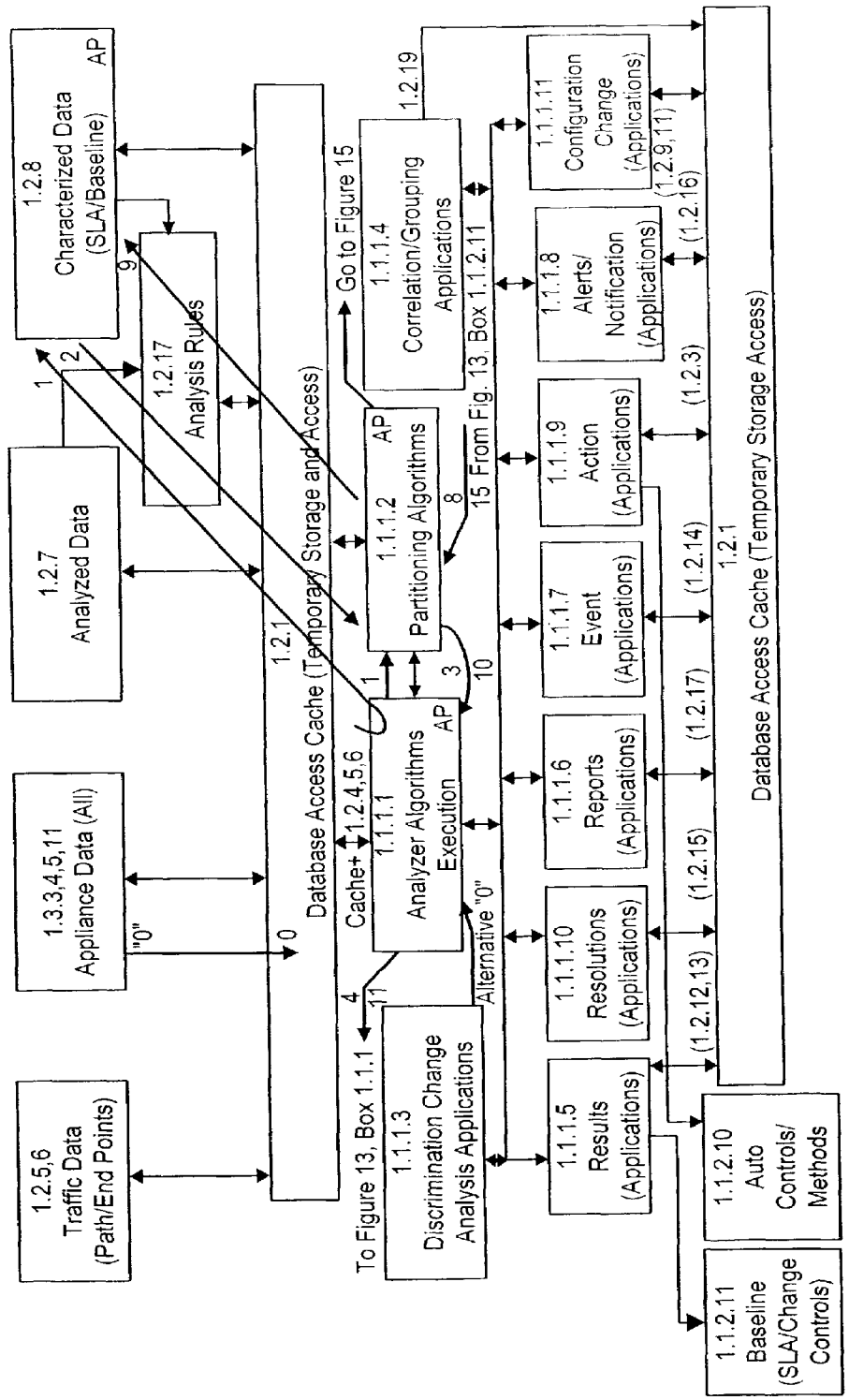
FIG. 14 is a block diagram of the autopartitioning, end-to-end component baseline/service level agreement database analysis, with modules associated with autopartitioning marked with lettering AP.
Figure 15:
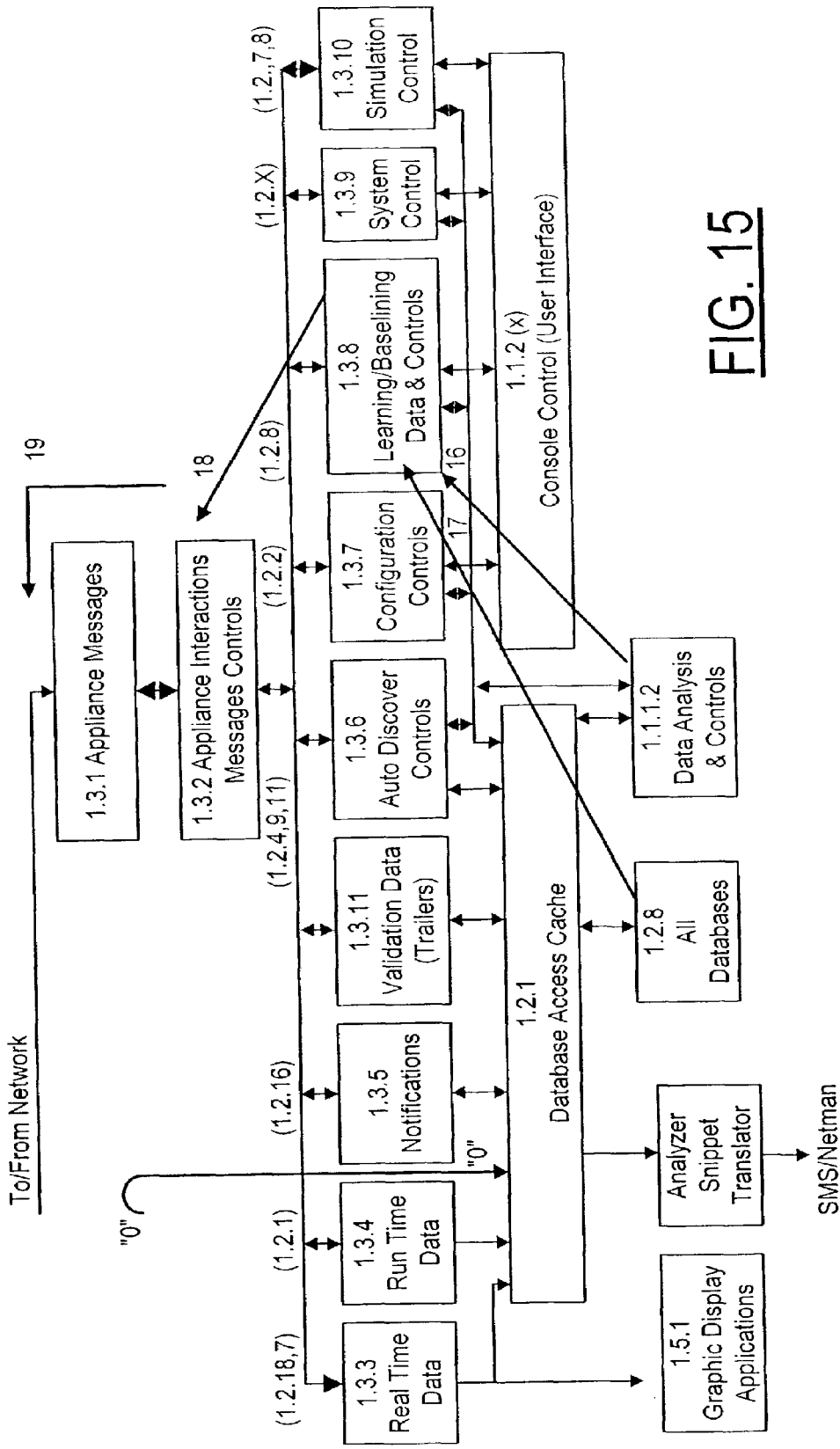
FIG. 15 is a block diagram of the autopartitioning, end-to-end component baseline/service level agreement director console appliance interface.
Figure 16:
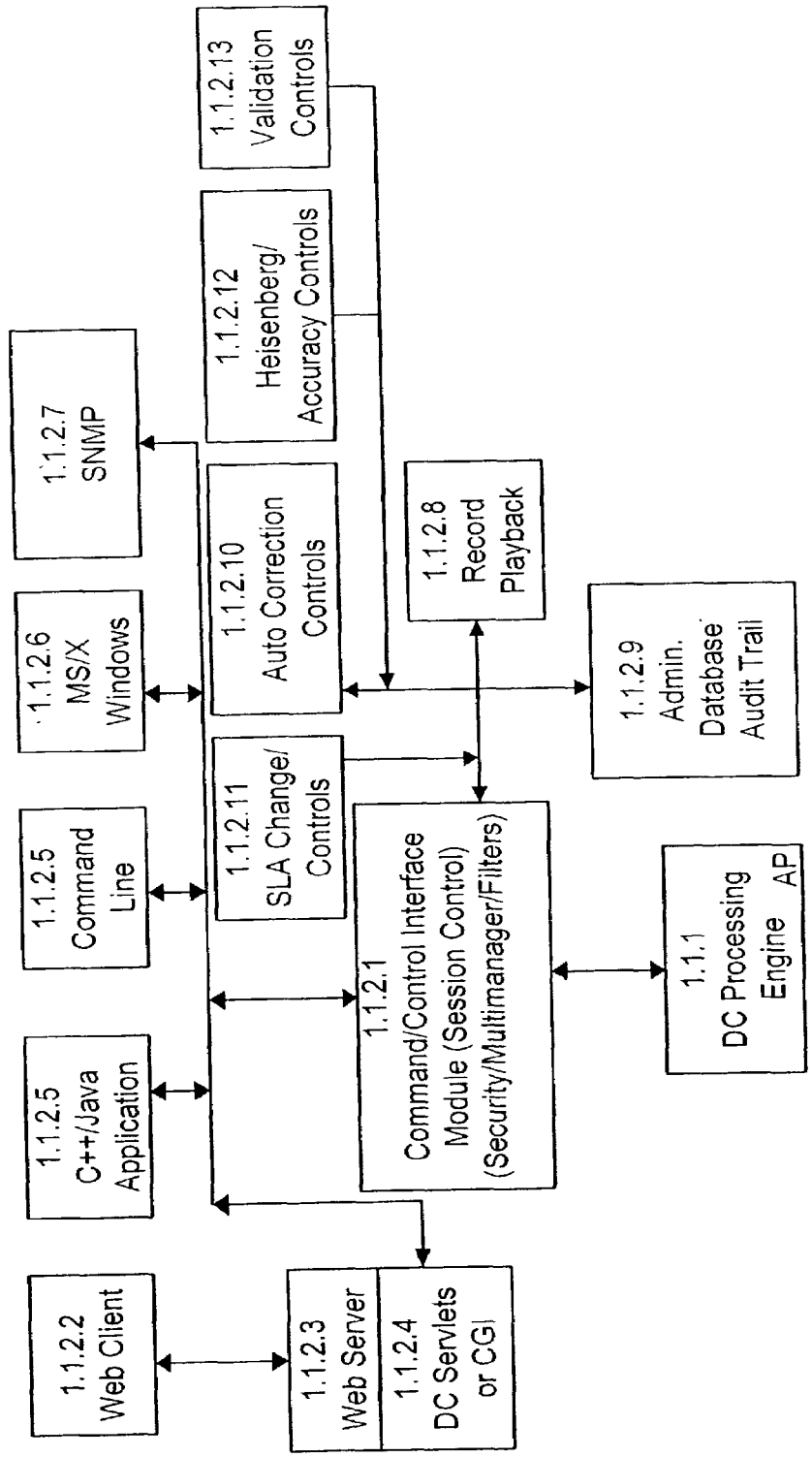
FIG. 16 is a block diagram of the director console architecture, director console control interface module.
Figure 17:
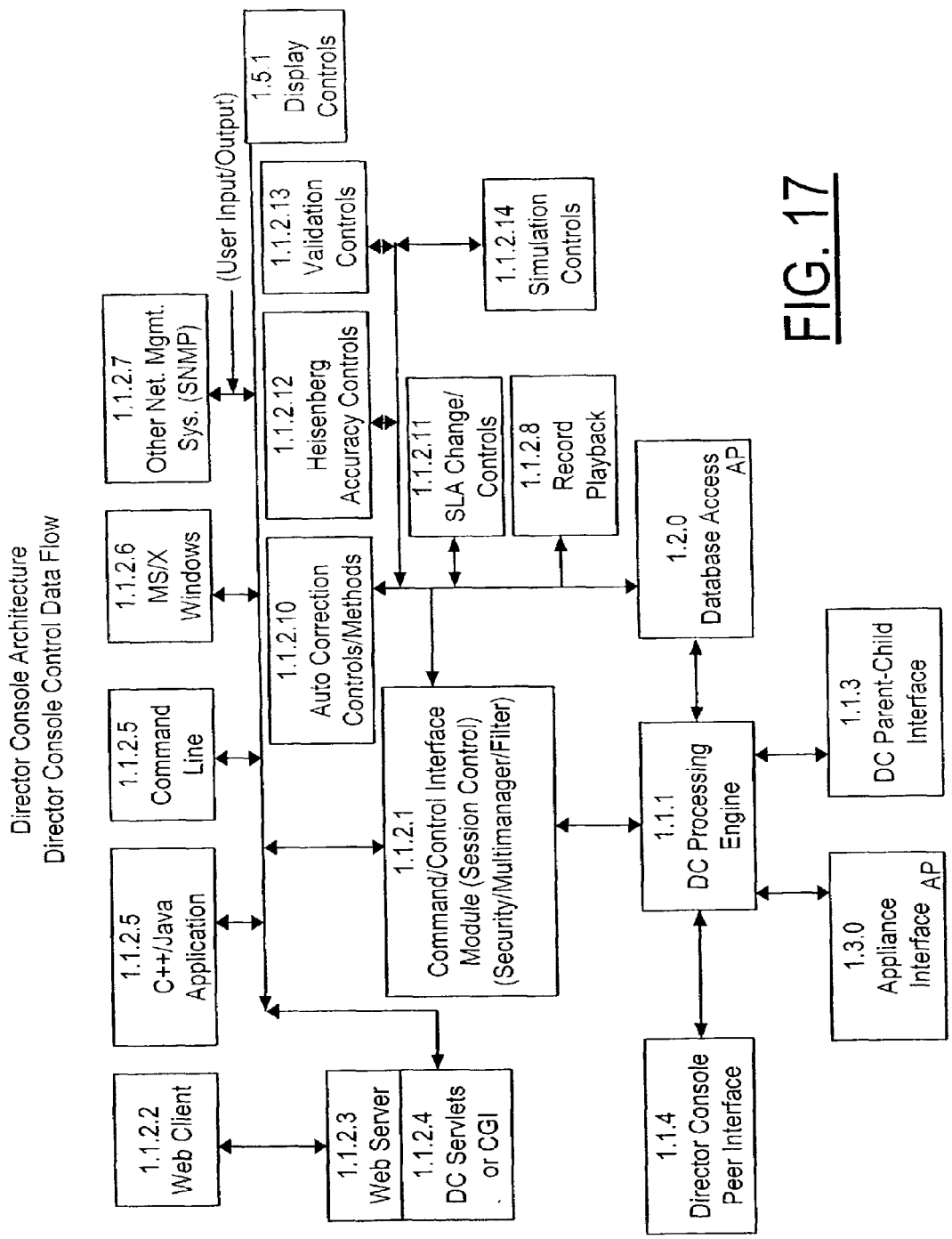
FIG. 17 is a block diagram of the director console architecture, director console control data blow.
Figure 18:
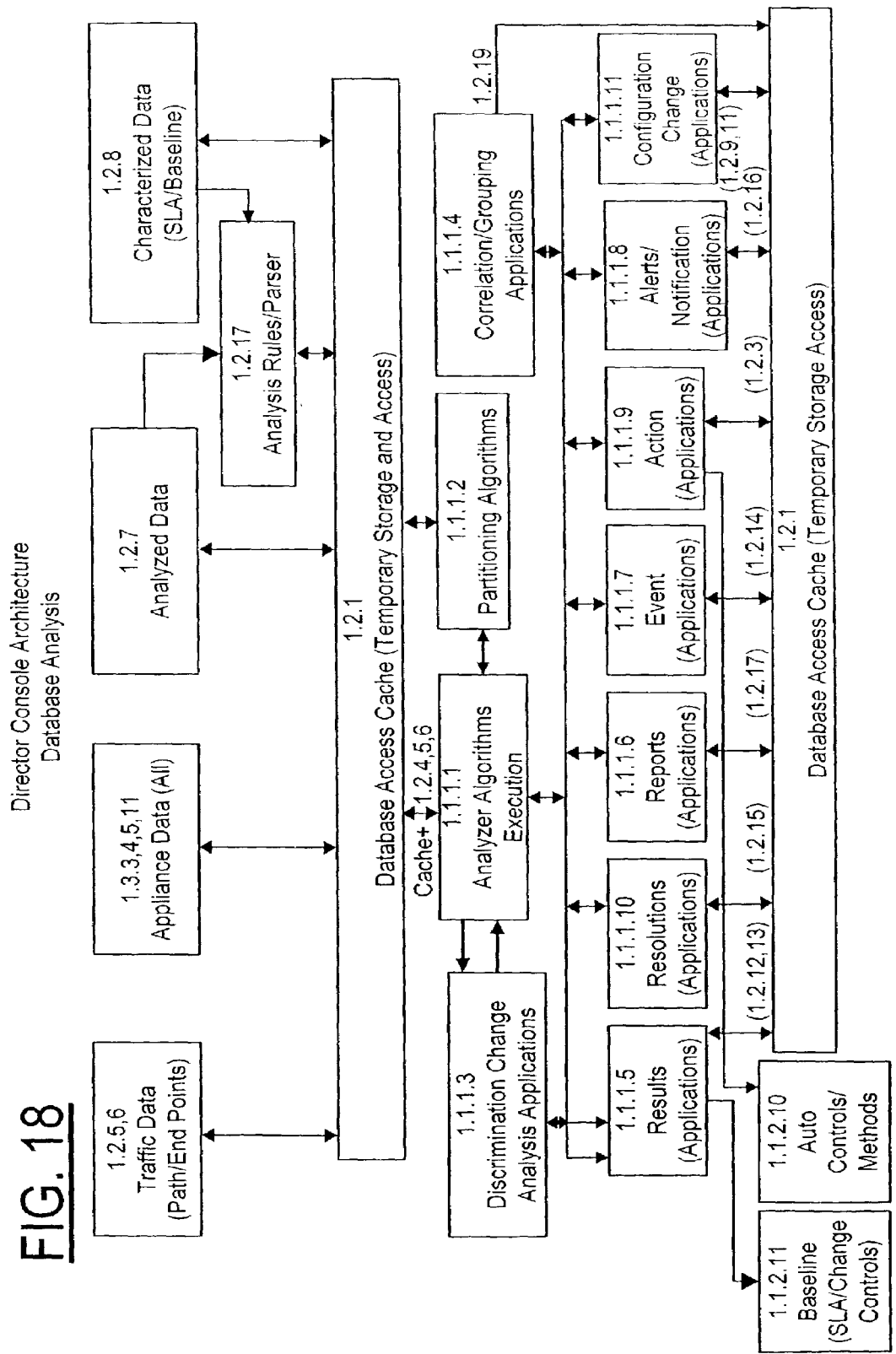
FIG. 18 is a block diagram of the director console architecture, database analysis.
Figure 19:
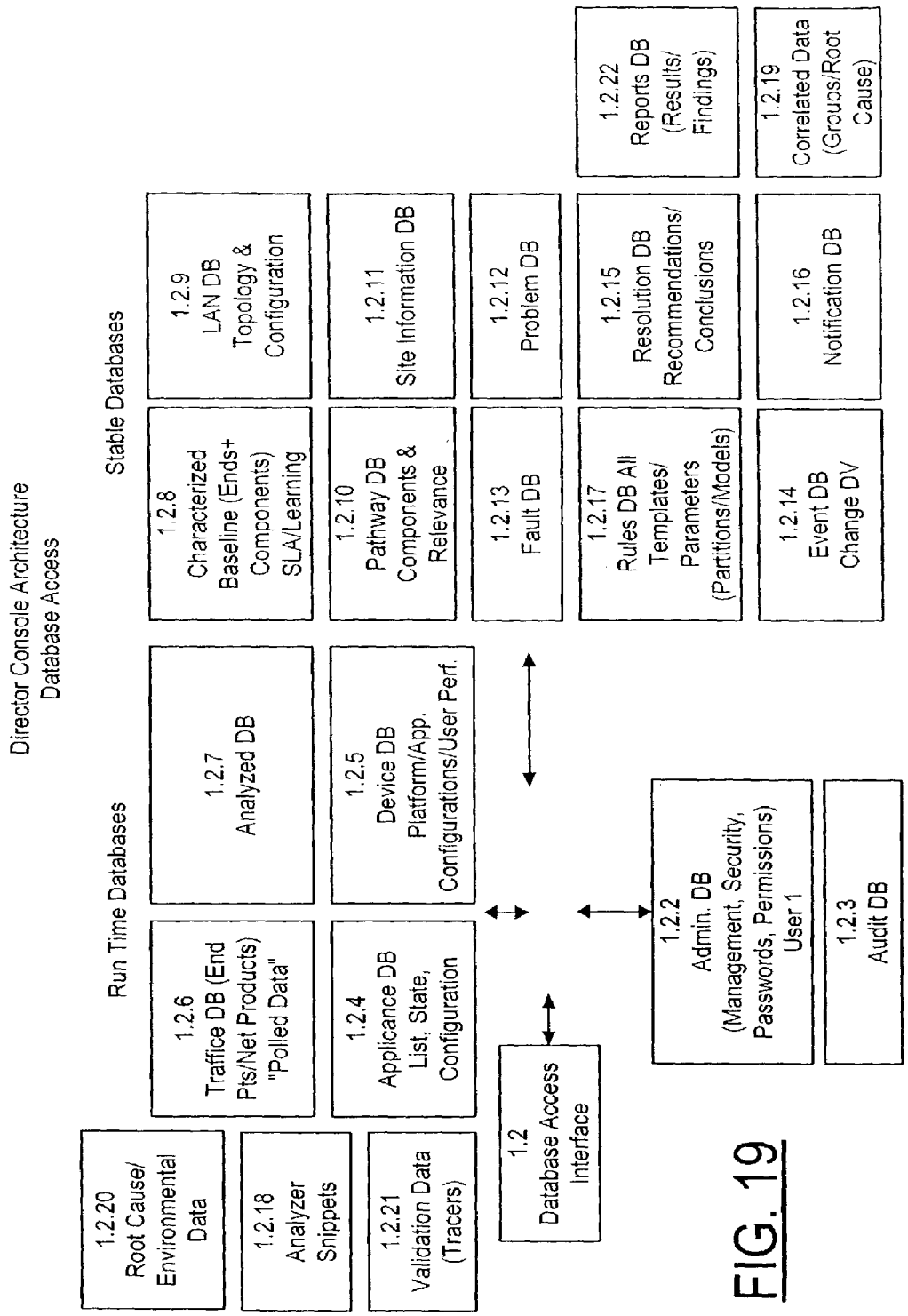
FIG. 19 is a block diagram of the director console architecture, database access.
Figure 20:
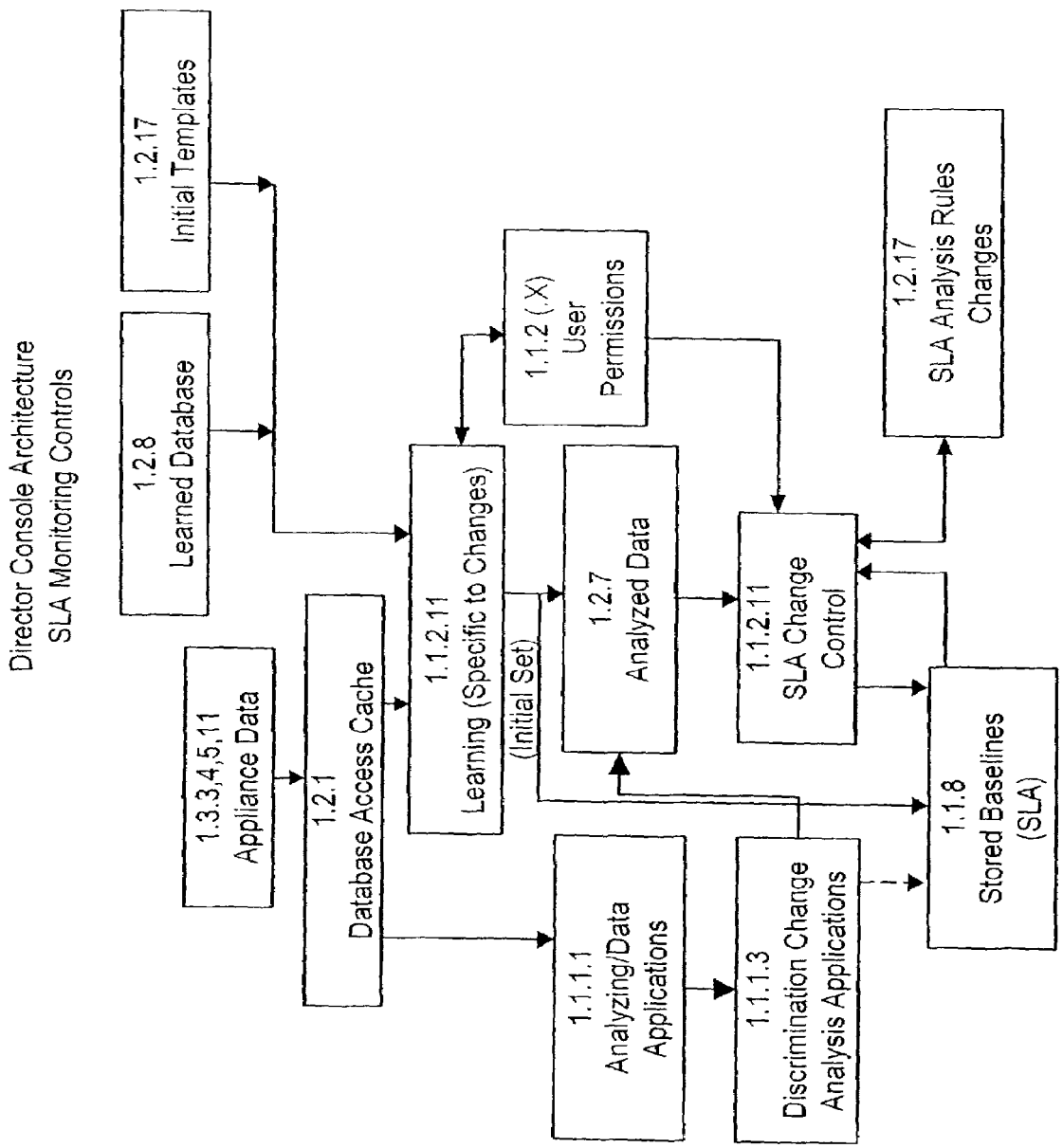
FIG. 20 is a block diagram of the data console architecture, service level agreement monitoring controls.
Figure 21:
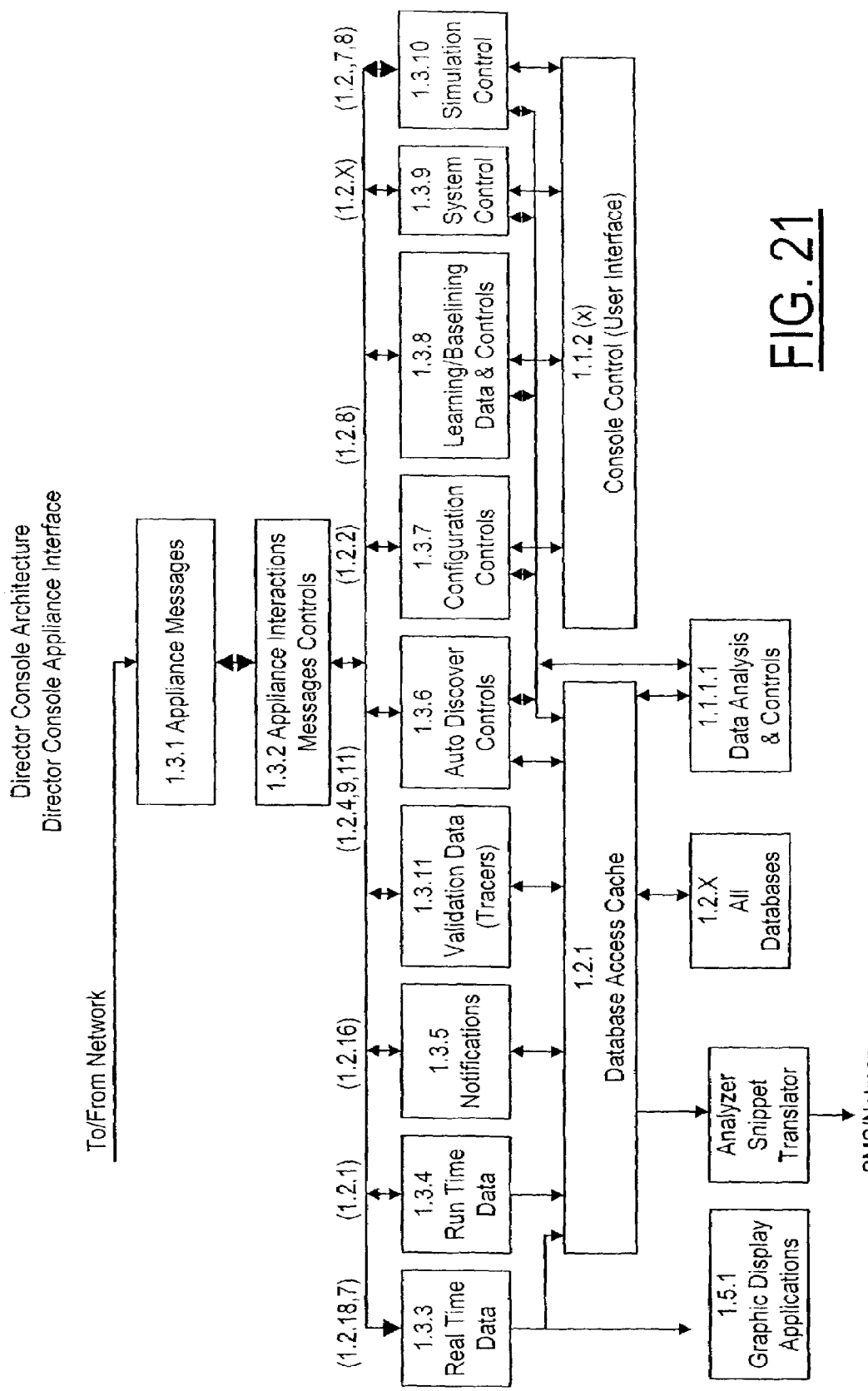
FIG. 21 is a block diagram of the director console architecture, director console appliance interface.

FIG. 5 is an overall block diagram of the director console 54, FIG. 6 is an overall block diagram of the director console interfaces, FIG. 7 is an overall block diagram of the director console control interface module and FIG. 8 is an overall block diagram of the director console control data flow. The modules pertaining to autobaselining are marked with the letter "AB" for these figures as well as FIG. 10. The flow paths for autobaselining are shown in FIGS. 9, 11 and 12.

4.0 Autopartitioning (Component Modeling) 66

Autopartitioning is the process of apportioning any/all of end-to-end baseline metrics among the components that make up/affect any end-to-end path. The partitioning algorithms can consist of a separate and distinct methodology/model. The models and partitioning algorithms reside in the director console 54. The director console utilizes the data gathered from all (SLA & Appliance) Tools, and other network management information (if available). A description of the components follows. See FIGS. 5A, 6A, 13, 14, 15, 3D and 4D for the flow paths associated with AutoPartitioning: End to End component Baseline/SLA. Modules with the letters AP are modules associated with the autopartitioning process.

4.1 Automatic Path Modeling

Identifying the key components (type, make, vendor, capacity, configuration) that make up any end-to-end path, specifically focusing on those components that can affect business bandwidth adversely. Any pathway's key components consist of at least the following default model:
Application platform (client/user side)
Locally attached network
Internetwork (WAN)
Remote locally attached network
Application platform (server/user side)
These individual components may require further breakdown into further sub-components (e.g., an iterative breakdown of each component). For example, a second level breakdown for a server platform may consist of:
CPU performance (one to N)
Disk performance
Memory utilization
Application utilization (threads, processes)
Imbedded network stack 4.2 Knowledge Based Partitioning Algorithms These partitioning algorithms, running on the director console 54, use almost exactly the same methodology as the closed loop autobaselining algorithms previously described.

4.2.1 Knowledge Based Partitioning Templates

Start with an embedded set of "standard" partitioning templates (for each application with scale and scope modifiers). Then take the specific path model (which identifies the key components and their characteristics that make up any path) and initial baselines (characterization) (including user input) and develop a first model for the key components that make up any specific end-to-end pathway.

4.2.2 User Input

Either default with the initial partitioning or give users an opportunity to specify a set of configuration metrics (priorities, extensibility concerns for any components, cost constraints for any component, etc.). This user input "tunes" the partitioning templates developed above (component baselines).

4.2.3 Monitored Results

Utilize real time data collected from the autolearning and autobaselining modules and perform "change partitioning" algorithms to determine if repartitioning end-to-end metrics are required (repartitioning of end-to-end metrics would result in a better bandwidth management by doing specific component metric tradeoffs). An example: The server transaction latency may exceed its individual component threshold but the end-to-end latency is still being met. The other components are lightly loaded and are exceeding specification. As long as the other components can stay lightly loaded (e.g., a modified metric), you can accept/modify the latency metric for the server.

4.2.4 Adjustment/Recommendation Methods

These methods recommend changes to the partitioning of key performance metrics and include collecting and displaying the following:
Original partitioning metrics
What has changed/been learned?
What is new, recommended partitioning metric?
Are other partitioning metrics being affected?
Rationale/importance/urgency of recommendation (See example in 4.2.3.)

4.2.5 Recommendation Approval

Either the user has already given implicit permission (if not denied/accept) or explicit permission (do all changes in these areas) or the user will determine whether or not to accept the recommendations. At any later point in time the user may wish to review unapproved recommendations and accept them. This implies recommendation history/logs with pertinent information saved as part of that log.

4.2.6 Tuning Change

The ability to modify the specific component's business bandwidth baseline metrics based on the above recommendations and approvals.

5.0 Associated Hardware

See FIG. 1—Typical Deployment—for a typical deployment. See FIGS. 3, 4 and 4E for bandwidth interconnecting module 41 and the master control module 43 for a bandwidth monitoring device 40 and FIGS. 5-12 for details concerning the director console 54.

In summary, the processes associated with automatically baselining business bandwidth are:
Autobaselining of business bandwidth for both end-to-end and component to component (e.g., characterizing in one model both end-to-end and specific components that make up any end-to-end pathway). An important point is that the end-to-end and component data are collected synchronously (at the same time), allowing for easy cause analysis.
autobaselining that combines the four key business bandwidth components that can learn and tune itself without user input.
autodiscovery of business bandwidth sources and sinks.
autolearning of application bandwidth/utilization/performance.
autobaselining of end-to-end bandwidth (algorithms to translate observed data into specific end-to-end top "SLA" metrics.
autopartitioning algorithms/methodologies that take observed data and end-to-end top "SLA" metrics and apportion these metrics to specific component metrics (component "SLA" baseline/metrics).

Thus what has been described is an overall method of determining characteristics of business bandwidth through use of autodiscovery, autolearning, autobaselining and optionally autopartitioning. It will be clear to anyone of ordinary skill in the art that modifications of these processes may be made without departing from the overall concepts presented herein. Such modification are within the scope of the present invention.

What is claimed is:

1. A method for use in a global network comprising two or more networks, wherein information is communicated via packets of one or more types associated with a corresponding application, each packet of the packets of the one or more types having a corresponding header with at least one portion of said header indicative of business bandwidth of the corresponding application, each of said two or more networks having various devices operating as sources of packets, destinations for packets, or both, each of said two or more networks interconnected to one or more other networks via at least one switch fabric, said method for providing on a run-time bases an indication of an actual service level in at least a portion of said global network for comparison with a service level agreement for at least said portion of said global network, said method comprising the steps of:
on a run-time basis intercepting packets traversing said at least one switch fabric;
on a run-time basis extracting information indicative of business bandwidth, including information concerning any new connection, break/disconnect, abort or timeout on a connection between a source of packets and a destination of packets, of said corresponding application from said at least one portion of said header of each of said intercepted packets as well as component modeling of components that make up an end-to-end path of said intercepted packets and returning each said intercepted packet to the switch fabric from which each intercepted packet was intercepted so as to allow the packet to continue to a destination associated with each said intercepted packet;
on a run-time basis determining from said extracted information, information about application business bandwidth between a source and a destination of said intercepted packets;
on a run-time basis providing said indication of the actual service level in said at least a portion of the global network according to the determined application bandwidth for comparing said indication to said service level agreement;
utilizing the actual service level to determine if repartitioning of end-to-end metrics are required; and
recommending a change in network service offering including a change in partitioning of end-to-end metrics to a user of the global network if said repartitioning is required.

2. The method of claim 1, wherein said step of determining is for determining at least one utilization characteristic of the source and the destination of said intercepted packets.

3. The method of claim 2, further comprising the step of tallying instances of said at least one utilization characteristic of an endpoint of said global network acting as one or more sources, one or more destinations, or a combination thereof for providing a tally of said instances of said at least one utilization characteristic.

4. The method of claim 3, further comprising the steps of:
providing said tally of instances of said at least one utilization characteristic for evaluation by a user or by comparison to a predefined application template; and
selecting said service level agreement according to said evaluation.

5. The method of claim 2, further comprising the step of tallying instances of said at least one utilization characteristic of at least one application regardless of source or destination for providing a tally of said instances of said at least one utilization characteristic.

6. The method of claim 5, further comprising the steps of:
providing said tally of instances of said at least one utilization characteristic for evaluation by a user or by comparison to a predefined application template; and
selecting said service level agreement according to said evaluation.

7. The method of claim 1, wherein said step of determining is for determining a list of applications.

8. The method of claim 7, further comprising the step of determining utilization characteristics of said listed applications.

9. The method of claim 8, further comprising the step of tallying instances of said utilization characteristics of said listed applications for providing a tally of said instances of said utilization characteristics.

10. The method of claim 9, further comprising the steps of:
providing said tally of instances of said utilization characteristics for evaluation by a user or by comparison to one or more predefined application templates; and
selecting said service level agreement according to said evaluation.

11. The method of claim 1, wherein said step of determining is for determining at least one utilization characteristic of a path over a global network physical media between a source and a destination.

12. The method of claim 11, further comprising the steps of:
tallying instances of said at least one utilization characteristic of said path for providing a tally of said instances of said utilization characteristic;
providing said tally of instances of said utilization characteristic for evaluation by a user or by comparison to a predefined application template; and
selecting said service level agreement according to said evaluation.

13. The method of claim 3, wherein said at least one utilization characteristic is of a path over a global network physical media between a source and a destination.

14. The method of claim 13, further comprising the steps of:
tallying instances of said at least one utilization characteristic of said path for providing a tally of said instances of said utilization characteristic;
providing said tally of instances of said utilization characteristic for evaluation by a user or by comparison to a predefined application template; and
selecting said service level agreement according to said evaluation.

15. The method of claim 1, wherein the step of determining information about application business bandwidth comprises determining a user profile based upon user definable information contained with part of the extracted information.

16. The method of claim 15, wherein part of the definable information contained with the extracted information is user identification information.

17. The method of claim 15, wherein part of the user definable information contained within the extracted information is an IP address of the source of an associated packet.

18. The method of claim 15, wherein part of the user definable information contained with the extracted information is an IP address of the destination.

19. The method of claim 15, wherein part of the user definable information contained with the extracted information is a domain of a device associated with the source of the intercepted packets.

20. The method of claim 15, wherein part of the user definable information contained within the extracted information is a domain of a device associated with the destination of the intercepted packets.

21. The method of claim 15, wherein the user definable information contained within the extracted information is directed to a class of service of each intercepted packet.

22. The method of claim 15, wherein the user definable information contained within the extracted information is directed to a type of packet including whether each intercepted packet is a broadcast, multicast or destination directed packet.

23. The method according to claim 22, wherein the extracted information is used to determine parameters associated with the transfer of packets.

24. The method according to claim 23, wherein the parameters include a length of time between sending a packet and receiving a packet in return, whether a packet is dropped in route to a destination of said packet, and a change in latency between packets intended for the same destination.

25. The method according to claim 24, wherein at least one of the parameters is partitioned amongst said two or more networks of the global network so that a magnitude of a parameter is measured within each of said two or more networks through which the intercepted packets traverse.

26. The method as defined in claim 25, wherein different parameters have different partition values for the same network over which intercepted packets traverse.

27. The method as defined in claim 26, further wherein a knowledge base is created which represents the values of the parameters for each network over which each intercepted packet traverses.

28. The method as defined in clam 27, wherein said knowledge base is combined to form a template defining desired characteristics of the global network with respect to communication of particular packet types over said global network between sources and destinations.

29. The method as defined in claim 28, wherein said template is user defined.

30. The method as defined in claim 29, wherein the template is defined through accumulation of information associated with traverse of packets over the global network.

31. The method as defined in claim 30, wherein the values of the parameters are scaled based upon observing the parameters for the traverse of packets between a predetermined number of users and extrapolating the of the parameter for a different number of users.

32. The method as defined in claim 31, wherein an overall performance of each of said two or more networks is determined by combining the actual service level with additional loading of the global network based upon the addition of applications to one or more of said two or more networks within the global network.

33. The method as defined in claim 32, wherein a performance of each of said two or more networks with the addition of the applications is determined based upon the use of said applications by one or more users of the applications.

34. The method as defined in claim 1, wherein the indication of actual service level is compared to a service provider's network offering so as to allow a user of said network to determine if the user's network needs have changed or if the service provider's network offering has changed, so as to recommend a change of a service offering to the user.

35. The method as defined in claim 34, wherein a service level agreement of the user is automatically modified based upon a determined change in the user's network needs if implicit permission has been given by the user.

36. A system for measuring business bandwidth representing an actual service level for comparison with a service level agreement, said business bandwidth associated with an interconnection of a plurality of networks forming a global network sending packets of information associated with a corresponding application from sources to destinations, said packets of one or more types, each packet of the packets of the one or more types having a corresponding header with at least one portion of said header indicative of business bandwidth of the corresponding application comprising:

a plurality of bandwidth monitoring devices for determining characteristics of packets passing from at least one device on one of said plurality of networks to another device on the same network or a different network of said plurality of networks, each bandwidth monitoring device comprising:

memory for saving monitored information;

a bandwidth interconnection module connected to said one of the networks of the plurality of networks for retrieving information regarding part of substantially all packets of at least one type passing through said one of said plurality of networks at a first location, including information concerning any new connection, break/disconnect, abort or timeout on a connection between a source of packets and a destination of packets as well as component modeling of components that make up an end-to-end path of said extracted packets, and a master control module for analyzing said retrieved information; and at least one director console the director console having:

means for communicating with at least one of the plurality of bandwidth monitoring devices, means for analyzing the retrieved information so as to determine business bandwidth baseline information regarding characteristics of said retrieved information analyzed so as to provide an indication of an actual service level in at least a portion of the global network, means for utilizing the actual service level to determine if repartitioning of end-to-end metrics are required; and means for recommending a change in network service offering including a change in partitioning of end-to-end metrics to a user of the global network if said repartitioning is required.

37. The system as defined in claim 36, further comprising means for comparing said indication of the actual service level to said service level agreement.

38. The system as defined in claim 37, further comprising means for modifying the service level agreement of the user based on said means for comparing said indication of the actual service level to said service level agreement.

39. The method of claim 1, further comprising autopartitioning components that make up or offset any path between a source and a destination based on determined application business bandwidth.

40. The system as defined in claim 36 further comprising means for autopartitioning components that make up or offset any path between a source and a destination based on determined application business bandwidth.

* * * * *

UNITED STATES PATENT AND TRADEMARK OFFICE
CERTIFICATE OF CORRECTION

PATENT NO. : 7,610,327 B2 Page 1 of 1
APPLICATION NO. : 10/223067
DATED : October 27, 2009
INVENTOR(S) : Kryskow, Jr. et al.

It is certified that error appears in the above-identified patent and that said Letters Patent is hereby corrected as shown below:

At column 14, line 38, claim 31, line 4, please insert the word --values-- after the word "the".

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,610,327 B2 |
| APPLICATION NO. | : 10/223067 |
| DATED | : October 27, 2009 |
| INVENTOR(S) | : Joseph M. Kryskow, Jr. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Twelfth Day of October, 2010

David J. Kappos
*Director of the United States Patent and Trademark Office*